US012469451B2

(12) United States Patent
Fan et al.

(10) Patent No.: US 12,469,451 B2
(45) Date of Patent: Nov. 11, 2025

(54) ARRAY BASE PLATE, DISPLAY PANEL AND DISPLAY DEVICE

(71) Applicants: YUNNAN INVENSIGHT OPTOELECTRONICS TECHNOLOGY CO., LTD., Yunnan (CN); BOE Technology Group Co., Ltd., Beijing (CN)

(72) Inventors: Longfei Fan, Beijing (CN); Yaoxi Ma, Beijing (CN); Xiaochuan Chen, Beijing (CN); Qingshan Shan, Beijing (CN); Pengcheng Lu, Beijing (CN); Shengji Yang, Beijing (CN); Shanghong Jiang, Beijing (CN)

(73) Assignees: Yunnan Invensight Optoelectronics Technology Co., Ltd., Yunnan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/683,639

(22) PCT Filed: Jan. 4, 2023

(86) PCT No.: PCT/CN2023/070404

§ 371 (c)(1),
(2) Date: Feb. 14, 2024

(87) PCT Pub. No.: WO2024/145814

PCT Pub. Date: Jul. 11, 2024

(65) Prior Publication Data

US 2025/0140184 A1 May 1, 2025

(51) Int. Cl.
*G09G 3/32* (2016.01)
*G09G 3/3233* (2016.01)

(52) U.S. Cl.
CPC ............. *G09G 3/3233* (2013.01); *G09G 3/32* (2013.01); *G09G 2300/0426* (2013.01);
(Continued)

(58) Field of Classification Search
CPC ........... H01L 27/32; H01L 51/52; G09G 3/32; G09G 3/3233; G09G 2300/0426; G09G 2320/0209; G09G 2320/0233
See application file for complete search history.

(56) References Cited

U.S. PATENT DOCUMENTS

2015/0356920 A1 12/2015 Na et al.
2016/0233288 A1 8/2016 Lee et al.
(Continued)

FOREIGN PATENT DOCUMENTS

CN 114127836 A 3/2022
CN 114930543 A 8/2022
(Continued)

*Primary Examiner* — Michael A Faragalla
(74) *Attorney, Agent, or Firm* — WHDA, LLP

(57) ABSTRACT

An array base plate includes a substrate; a plurality of sub-pixels; and a plurality of gate lines and a plurality of data lines, wherein the plurality of gate lines intersect with the plurality of data lines, each of the sub-pixels is located at a position limited by two adjacent gate lines and two adjacent data lines, and each of the sub-pixels includes a pixel driving circuit and a light emitting device that are connected; wherein the pixel driving circuit includes: a drive module and a first control module, the pixel driving circuit further includes an auxiliary anode, the auxiliary anode is located between the anode and the substrate, and the auxiliary anode is electrically connected to the anode; the first power signal line includes a first part and a second part that are electrically connected.

20 Claims, 16 Drawing Sheets

(52) U.S. Cl.
CPC .................. *G09G 2310/08* (2013.01); *G09G 2320/0209* (2013.01); *G09G 2320/0233* (2013.01)

(56) References Cited

U.S. PATENT DOCUMENTS

| | | | | |
|---|---|---|---|---|
| 2018/0114824 | A1* | 4/2018 | Lee ...................... | H10K 59/131 |
| 2018/0308918 | A1* | 10/2018 | Choi .................... | G09G 3/3233 |
| 2020/0143740 | A1 | 5/2020 | Tsuboi et al. | |
| 2021/0111227 | A1 | 4/2021 | Tsuboi | |
| 2021/0384280 | A1 | 12/2021 | Akiyama et al. | |
| 2022/0044636 | A1 | 2/2022 | Mou et al. | |
| 2022/0172679 | A1 | 6/2022 | Akiyama et al. | |
| 2022/0208927 | A1 | 6/2022 | Yang et al. | |
| 2022/0320194 | A1 | 10/2022 | Du et al. | |
| 2022/0328589 | A1 | 10/2022 | Chen et al. | |
| 2024/0169911 | A1 | 5/2024 | Feng et al. | |

FOREIGN PATENT DOCUMENTS

| | | | |
|---|---|---|---|
| JP | 2002-341790 | A | 11/2002 |
| WO | 2022/067581 | A1 | 4/2022 |
| WO | 2022/252029 | A1 | 12/2022 |

* cited by examiner

ARRAY BASE PLATE, DISPLAY PANEL AND DISPLAY DEVICE

TECHNICAL FIELD

The present application relates to the technical field of display and more particularly, to an array base plate, a display panel, and a display device.

BACKGROUND

Micro Light-Emitting Diode (Micro LED) display device is a type of micro display that has developed in recent years, and silicon-based OLED micro display is one of them. Silicon-based OLED micro displays can not only achieve active addressing of pixels, but also achieve the fabrication of pixel driving circuits and other structures on silicon substrates, which is beneficial for reducing volume and achieving lightweight performance.

SUMMARY

The embodiment of the present application employs the following technical solutions:

In a first aspect, the embodiment of the present application provides an array base plate, including:

- a substrate;
- a plurality of sub-pixels that are located on the substrate and arranged in array; and
- a plurality of gate lines and a plurality of data lines, wherein the plurality of gate lines intersect with the plurality of data lines, each of the sub-pixels is located at a position limited by two adjacent gate lines and two adjacent data lines, and each of the sub-pixels includes a pixel driving circuit and a light emitting device that are electrically connected; wherein the pixel driving circuit includes:
- a drive module electrically connected to a first node, a second node and an anode of the light emitting device, wherein the drive module is configured for conducting a path between the second node and the anode under control of a voltage of the first node, and generating a current in the path to make the light emitting device emit light; the second node is coupled to the first power signal line; and
- a first control module electrically connected to a first control signal line, a second power signal line and the anode of the light emitting device, wherein the first control module is configured for transferring a second power signal transmitted by the second power signal line to the anode under control of a first control signal transmitted by the first control signal line;
- wherein the pixel driving circuit further includes an auxiliary anode, the auxiliary anode is located between the anode and the substrate, and the auxiliary anode is electrically connected to the anode; the first power signal line includes a first part and a second part that are electrically connected, the first part of the first power signal line and the first control signal line are arranged on a same layer, and the second part of the first power signal line and the auxiliary anode are arranged on a same layer.

In some embodiments of the present application, the pixel driving circuit further includes a second control module;

- the second control module is electrically connected to the first power signal line, a second control signal line and the drive module, and configured for transferring a first power signal transmitted by the first power signal line to the drive module under control of a second control signal transmitted by the second control signal line, and assisting in generating the current in the path to make the light emitting device emit light;
- wherein an orthographic projection of the second control module on the substrate overlaps with an orthographic projection of the second part of the first power signal line on the substrate.

In some embodiments of the present application, the pixel driving circuit further includes an input module;

- the input module is electrically connected to the gate lines, the data lines and the first node, and configured for writing data signals transmitted by the data lines into the first node under control of scan signals transmitted by the gate lines;
- wherein an orthographic projection of the input module on the substrate overlaps with orthographic projections of the gate lines on the substrate, and the orthographic projection of the input module on the substrate overlaps with an orthographic projection of the second control signal line on the substrate.

In some embodiments of the present application, the input module and the second control module are located at a same side of the drive module, and the first control module is located at a side of the drive module away from the second control module.

In some embodiments of the present application, the input module includes a first transistor, the drive module includes a driving transistor, the second control module includes a second transistor, and the first control module includes a third transistor;

- a gate of the first transistor is electrically connected to the gate line, a source of the first transistor is electrically connected to the data line, and a drain of the first transistor is electrically connected to a gate of the driving transistor;
- a gate of the second transistor is electrically connected to the second control signal line, a source of the second transistor is electrically connected to the first power signal line, and a drain of the second transistor is electrically connected to a source of the driving transistor; and
- a gate of the third transistor is electrically connected to the first control signal line, a source of the third transistor is electrically connected to a drain of the driving transistor, and a drain of the third transistor is electrically connected to the second power signal line.

In some embodiments of the present application, the pixel driving circuit further includes a first wiring, an extension direction of the first wiring intersects with an extension direction of the first control signal line, the first wiring is electrically connected to the gate of the third transistor and the first control signal line, and the first wiring and the data lines are arranged on a same layer.

In some embodiments of the present application, an orthographic projection of the gate of the third transistor on the substrate partially overlaps with an orthographic projection of the first control signal line on the substrate, an orthographic projection of the first wiring on the substrate partially overlaps with the orthographic projection of the gate of the third transistor on the substrate, the orthographic projection of the first wiring on the substrate extends from a side of the gate of the third transistor close to the first control signal line to a side of the gate of the third transistor away from the first control signal line, and the orthographic projection of the first wiring on the substrate overlaps with an orthographic projection of an active region of the third transistor on the substrate.

In some embodiments of the present application, the pixel driving circuit further includes a second wiring, an extension direction of the second wiring is consistent with an extension direction of the data lines, the second wiring is electrically connected to the source of the second transistor and the first power signal line, and the second wiring and the data lines are arranged on the same layer.

In some embodiments of the present application, the extension direction of the second wiring intersects with an extension direction of the gate lines, and an orthographic projection of the second wiring on the substrate partially overlaps with the orthographic projection of the gate lines on the substrate; and the orthographic projection of the second wiring on the substrate extends from a position where an orthographic projection of the source of the second transistor on the substrate is located to a position where an orthographic projection of the first part of the first power signal line on the substrate is located.

In some embodiments of the present application, the orthographic projection of the second control signal line on the substrate overlaps with orthographic projections of the gate of the first transistor and the gate of the second transistor on the substrate; and the orthographic projection of the gate lines on the substrate overlaps with the orthographic projection of the gate of the first transistor on the substrate, and the orthographic projection of the gate lines on the substrate overlaps with an orthographic projection of an active region of the first transistor on the substrate.

In some embodiments of the present application, in a region where the same second control signal line is located, a distance from the gate of the first transistor along a direction parallel to the data lines to the gate of the driving transistor is greater than a distance from the gate of the second transistor along the direction parallel to the data lines to the gate of the driving transistor.

In some embodiments of the present application, in a region where the same row of sub-pixels are located, along a direction parallel to the data lines, a minimum distance from a part line segments of the second control signal line overlapping with the gate of the first transistor to the gate lines is less than a minimum distance from a part line segments of the second control signal line overlapping with the gate of the second transistor to the gate lines.

In some embodiments of the present application, orthographic projections of the data lines on the substrate overlap with an orthographic projection of the first part of the first power signal line on the substrate; and orthographic projections of the first transistor, the second transistor, the second control signal line and the gate lines on the substrate are located within the orthographic projection of the second part of the first power signal line on the substrate.

In some embodiments of the present application, the first power signal line further includes a third part, an extension direction of the third part of the first power signal line intersects with the extension direction of the first control signal line, and the third part of the first power signal line connects the first parts of first power signal lines of the sub-pixels in two adjacent rows together; and an orthographic projection of the third part of the first power signal line on the substrate partially overlaps with the orthographic projections of the data lines on the substrate and an orthographic projection of the first control signal line on the substrate, respectively.

In some embodiments of the present application, orthographic projections of the first part of the first power signal line and the third part of the first power signal line on the substrate jointly form a shape of a grid, and the sub-pixels are located in an enclosed region limited by the grid.

In some embodiments of the present application, the array base plate includes a semiconductor layer located on the substrate, the semiconductor layer includes a first part, a second part, a third part, a fourth part, a fifth part and a sixth part, and an area of an orthographic projection of the fourth part of the semiconductor layer on the substrate is greater than that of orthographic projections of the other parts of the semiconductor layer on the substrate;

the first part of the semiconductor layer includes the source, the drain and an active region of the first transistor, the second part of the semiconductor layer includes the source, the drain and an active region of the second transistor, the third part of the semiconductor layer includes the source, the drain and an active region of the third transistor, the fourth part of the semiconductor layer includes the source, the drain and an active region of the driving transistor, and the fifth part and the sixth part are both electrically connected to the substrate;

wherein in a region where one sub-pixel is located, the second part of the semiconductor layer and the fourth part of the semiconductor layer are an integrated structure; in the same row of sub-pixels perpendicular to an extension direction of the data lines, two sub-pixels are divided into one group, in a region where the same group of sub-pixels are located, two third parts of the semiconductor layers are an integrated structure.

In some embodiments of the present application, in the region where the same group of sub-pixels are located, two third transistors are symmetrically arranged, and two sixth parts of the semiconductor layer are symmetrically arranged.

In some embodiments of the present application, the array base plate further includes a gate layer located at a side of the semiconductor layer away from the substrate; and the gate layer includes the gates of the transistors, an orthographic projection of the gate layer on the substrate partially overlaps with an orthographic projection of the semiconductor layer on the substrate; regions of the semiconductor layer that overlap with the orthographic projection of the gate layer on the substrate are the active regions of the transistors, regions of the semiconductor layer that do not overlap with the orthographic projection of the gate layer on the substrate are the sources or the drains of the transistors; an area of an orthographic projection of the gate of the driving transistor on the substrate is greater than areas of orthographic projections of gates of other transistors on the substrate.

In some embodiments of the present application, the array base plate further includes a first conductive layer located at a side of the gate layer away from the substrate;

the first conductive layer includes a third power signal line, the gate lines, the second control signal line and the second power signal line; and the third power signal line is electrically connected to the fifth part of the semiconductor layer, and the second power signal line is electrically connected to the sixth part of the semiconductor layer.

In some embodiments of the present application, in a region where the same row of sub-pixels perpendicular to the extension direction of the data lines are located, the third power signal line includes a first line segment and a plurality of second line segments, the first line segment is connected to each second line segment, the second line segments are electrically connected to the fifth part of the semiconductor layer, an extension direction of the first line segment intersects with the extension direction of the data lines, an extension direction of each second line segment is consistent with the extension direction of the data lines, an orthographic projection of the first line segment on the substrate partially overlaps with an orthographic projection of the driving transistor on the substrate, orthographic projections of the second line segments on the substrate overlaps with an orthographic projection of the fifth part of the semiconductor layer on the substrate; and in the region where the same row of sub-pixels perpendicular to the extension direction of the data lines are located, the second power signal line includes a third line segment, a plurality of fourth line segments and a plurality of fifth line segment, the third line segment is connected to each fourth line segment and each fifth line segment, the fourth line segments are electrically connected to the drain of the third transistor, the fifth line segments are electrically connected to the sixth part of the semiconductor layer, extension directions of each fourth line segment and each fifth line segment are both consistent with the extension direction of the data lines, an extension direction of the third line segment intersects with the extension direction of the data lines, an orthographic projection of the fifth line segment on the substrate overlaps with an orthographic projection of the sixth part of the semiconductor layer on the substrate.

In some embodiments of the present application, the first conductive layer further includes a first connecting part, a second connecting part and a third connecting part, the first connecting part is electrically connected to the source of the third transistor and the drain of the driving transistor, the second connecting part is electrically connected to the gate of the driving transistor and the drain of the first transistor, and the third connecting part is electrically connected to the source of the first transistor and the data lines; and an orthographic projection of the third connecting part on the substrate overlaps with an orthographic projection of the first part of the first power signal line on the substrate.

In some embodiments of the present application, the pixel driving circuit further includes a compensation module, the compensation module is electrically connected to the first node, the second node and the first power signal line, and configured for compensating a threshold voltage of the drive module; and the compensation module includes a first capacitor and a second capacitor, a first polar plate of the first capacitor is electrically connected to the source of the driving transistor, a second polar plate of the first capacitor is electrically connected to the gate of the driving transistor; a first polar plate of the second capacitor is electrically connected to the source of the driving transistor, a second polar plate of the second capacitor is electrically connected to the first power signal line.

In some embodiments of the present application, the array base plate further includes a second conductive layer located at a side of the first conductive layer away from the substrate, the second conductive layer includes the data lines and a first conductive pattern, the first conductive pattern is electrically connected to the source of the driving transistor; and the second conductive layer further includes the first wiring and a second wiring.

In some embodiments of the present application, the array base plate further includes a third conductive layer located at a side of the second conductive layer away from the substrate, the third conductive layer includes the first control signal line, the second polar plate of the first capacitor and the first part of the first power signal line;

in the region where the same row of sub-pixels perpendicular to the extension direction of the data lines are located, the first part of the first power signal line includes a sixth line segment and a plurality of seventh line segments, each of the seventh line segments is connected to the sixth line segment, the seventh line segments are located between the second polar plates of two adjacent first capacitors, the sixth line segment is located at a side of the second polar plate of the first capacitor away from the first control signal line; an extension direction of the sixth line segment is consistent with the extension direction of the first control signal line; and an orthographic projection of the sixth line segment on the substrate partially overlaps with an orthographic projection of the first transistor on the substrate, an orthographic projection of the seventh line segment on the substrate partially overlaps with orthographic projections of the data lines on the substrate.

In some embodiments of the present application, the array base plate further includes a capacitance conductive layer located at a side of the third conductive layer away from the substrate, the capacitance conductive layer includes a second conductive pattern, an orthographic projection of the second conductive pattern on the substrate overlaps with an orthographic projection of the first conductive pattern on the substrate, and the second conductive pattern is indirectly electrically connected to the first conductive pattern.

In some embodiments of the present application, the array base plate further includes a fourth conductive layer located at a side of the capacitance conductive layer away from the substrate, the fourth conductive layer includes a third conductive pattern, the third conductive pattern is electrically connected to the first conductive pattern, and the third conductive pattern is electrically connected to the second conductive pattern; and the first conductive pattern, the second conductive pattern and the third conductive pattern collectively serve as the first polar plate of the first capacitor and the first polar plate of the second capacitor.

In some embodiments of the present application, the fourth conductive layer further includes a third part of the first power signal line and an adapter cable; and the third part of the first power signal line electrically connects seventh line segments of two adjacent rows of sub-pixels together, the adapter cable is electrically connected to the sixth line segment and the second part of the first power signal line, and an orthographic projection of the adapter cable on the substrate overlaps with the orthographic projection of the sixth line segment on the substrate.

In some embodiments of the present application, the array base plate further includes a fifth conductive layer located at a side of the fourth conductive layer away from the substrate, and a sixth conductive layer located at a side of the fifth conductive layer away from the substrate; and the fifth conductive layer includes the second polar plate of the second capacitor, the sixth conductive layer includes the second part of the first power signal line and the auxiliary anode, the second polar plate of the second capacitor is electrically connected to the second part of the first power signal line, an orthographic projection of the auxiliary anode on the substrate overlaps with orthographic projections of the third transistor and the driving transistor on the substrate, respectively.

In some embodiments of the present application, in the region where the same row of sub-pixels perpendicular to the extension direction of the data lines are located, a shape of the orthographic projection of the second part of the first power signal line on the substrate is comb shaped, an area of the orthographic projection of the second part of the first power signal line on the substrate is greater than an area of the orthographic projection of the first part of the first power signal line on the substrate.

In some embodiments of the present application, in the region where the same row of sub-pixels perpendicular to the extension direction of the data lines are located, the second part of the first power signal line includes a main extension portion and a plurality of branch extension portions; and an orthographic projection of the main extension portion on the substrate covers orthographic projections of the first transistor, the second transistor, the gate lines, the second control signal line, and the sixth line segment on the substrate, the branch extension portions are located in a region between two adjacent auxiliary anodes, and the branch extension portions overlap with orthographic projections of the seventh line segment and the data lines on the substrate.

In a second aspect, the embodiment of the present application provides a display panel, including the array base plate described in the first aspect.

In a third aspect, the embodiment of the present application provides a display device, including the display panel described in the second aspect.

The above description is only an overview of the technical solution of the present application. In order to have a clearer understanding of the technical means of the present application, it can be implemented according to the content of the specification. In order to make the above and other purposes, features, and advantages of the present application more obvious and easier to understand, the specific implementation methods of the present application are listed below.

BRIEF DESCRIPTION OF THE DRAWINGS

In order to more clearly illustrate the technical solutions of the embodiments of the present application, the figures that are required to describe the embodiments of the present application will be briefly described below. Apparently, the figures that are described below are merely a part of the embodiments of the present application, and a person skilled in the art can obtain other figures according to these figures without paying creative work.

DETAILED DESCRIPTION

Figure 1:
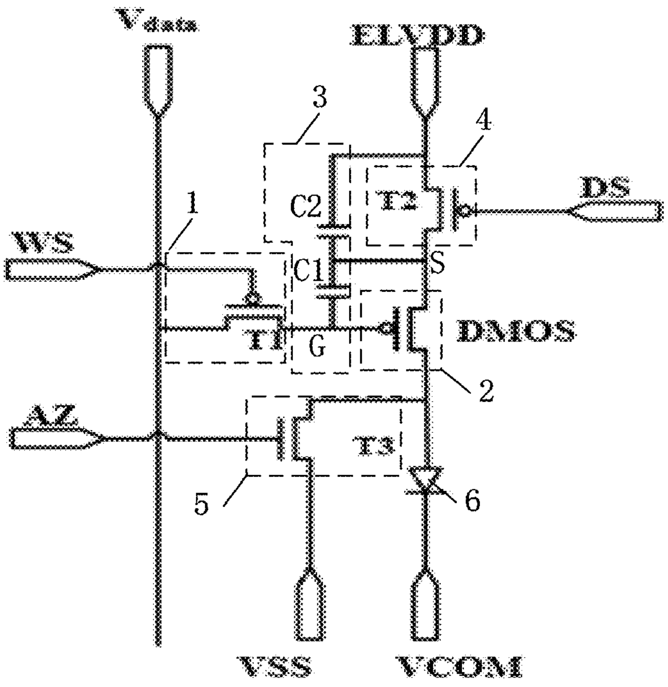
FIG. 1 is a schematic structural diagram of a pixel driving circuit according to an embodiment of the present application.

The technical solutions according to the embodiments of the present application will be clearly and completely described below with reference to the drawings according to the embodiments of the present application. Apparently, the described embodiments are merely a part of the embodiments of the present application, rather than all of the embodiments. All of the other embodiments that a person skilled in the art obtains on the basis of the embodiments of the present application without paying creative work fall within the protection scope of the present application.

Unless the context otherwise requires, in the entire specification and claims, the term "including" is interpreted as open and inclusive, meaning "including, but not limited to". In the description of the specification, the terms "one embodiment," "some embodiments," "exemplary embodiments," "examples," "specific examples," or "some examples," etc. are intended to indicate that specific features, structures, materials, or features related to the embodiment or example are included in at least one embodiment or example of the present application. The schematic representation of the above terms may not necessarily refer to the same embodiment or example. Furthermore, the specific features, structures, materials, or features described may be included in any one or more embodiments or examples in any appropriate manner.

Furthermore, it should be noted that when introducing the elements and embodiments of the present application, the articles "a/an", "one", "the" and "said" are intended to indicate the existence of one or more elements. Unless otherwise specified, "a plurality of" means two or more. The terms "comprising", "including", "containing", and "having" are intended to include and indicate the existence of elements other than those listed. The terms "first", "second", "third", etc. are only used for descriptive purposes and cannot be understood as indicating or implying relative importance or order of formation.

In the specification, unless otherwise specified and limited, the terms "installation", "connection", and "connect" should be interpreted broadly. For example, it can be a fixed connection, a detachable connection, or an integrated connection. It can be a mechanical connection or an electrical connection. It can be directly connected, indirectly connected through middleware, or connected internally between two components. For persons skilled in the art, they can understand the specific meanings of the above terms in the present application based on specific circumstances.

In the specification, "electrical connection" and "coupling" include the situation where the constituent elements are connected together through components with a certain electrical effect. There are no special restrictions on the transmission and reception of electrical signals between components that can be connected and have a certain electrical effect. Examples of components with certain electrical effects include not only electrodes and wiring, but also switching components such as transistors, resistors, inductors, capacitors, and other components with various functions.

In the specification, the "arranged on a same layer" used refers to a structure formed by patterning two (or more) structures through the same patterning process, and their materials can be the same or different. For example, the materials used to form precursors with multiple structures on the same layer are the same, and the resulting materials can be the same or different.

The polygons in the specification are not strictly defined, but can be approximate triangles, rectangles, trapezoids, pentagons, or hexagons. There may be some small deformations caused by tolerances, such as chamfers, fillets, arc edges, and deformations.

In the specification, "parallel" refers to the state where two straight lines form an angle of −10° or more but less than 10°. Therefore, it also includes states where the angle is −5° or more but less than 5°. In addition, "vertical" refers to the state where the angle formed by two straight lines is above 80° and below 100°, therefore, it also includes the state where the angle is above 85° and below 95°.

We will now refer to the accompanying drawings to provide a more comprehensive description of exemplary embodiments.

The silicon-based OLED micro display mainly consists of a drive module part called a silicon-based BP (Backplate) (also known as an array base plate) and a device part called OLED (Organic Light Emitting Diode). The silicon-based BP part mainly consists of several parts, including pixel driving circuit array, Source Driver, Gate Driver, Emission Control Driver, OSC (oscillator), Gamma Register, interface, and display control module. The OLED device part mainly consists of OLED, TFE (Thin File Encapsulation), CF (Color Filter), and Micro Lens. Compared to the traditional glass-based BP, the silicon-based BP is beneficial for reducing system volume, achieving lightweight, and is more suitable for display products with high PPI (Pixels Per Inch) and narrow bezel.

Figure 7:
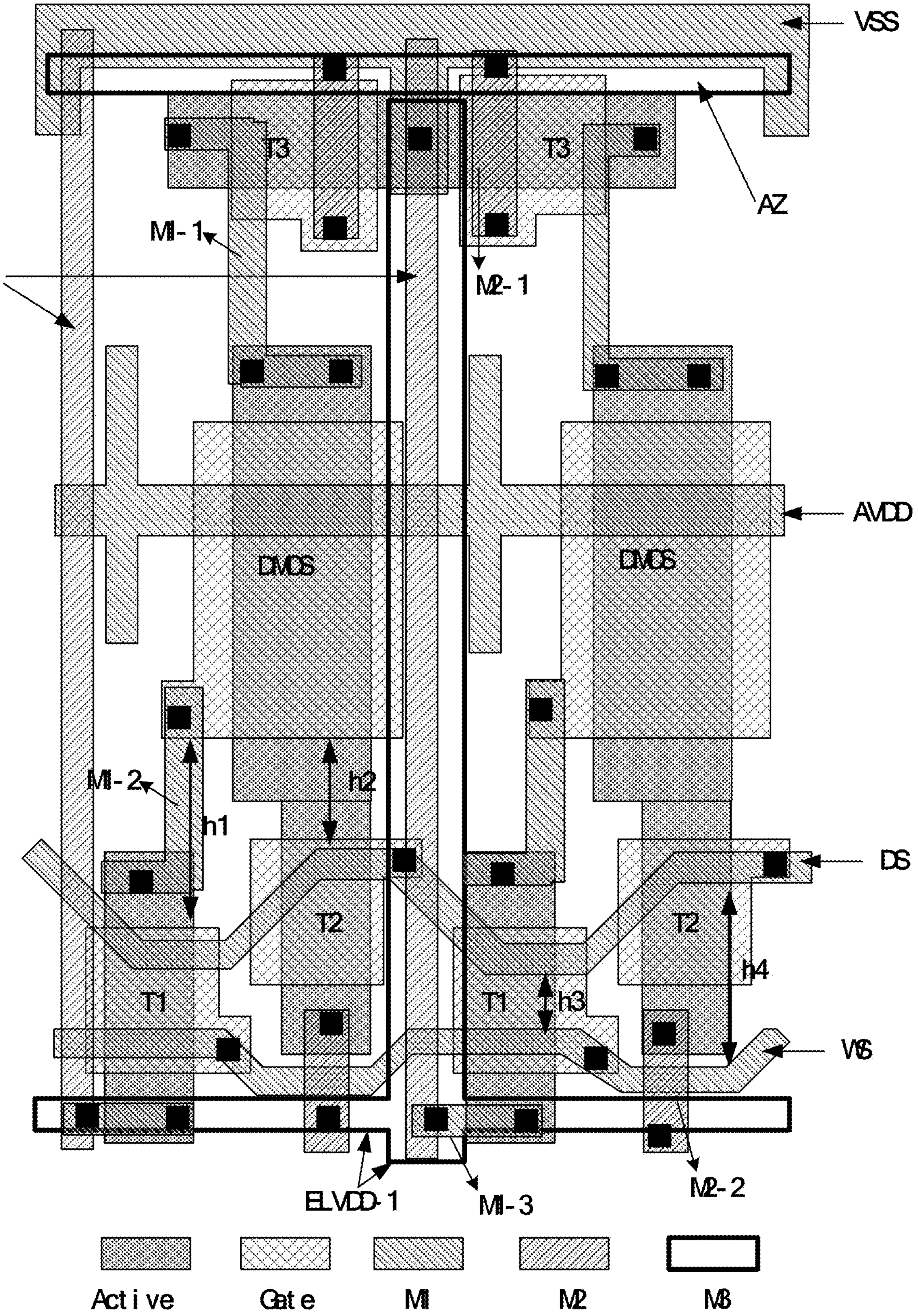
FIG. 7 is a simplified design layout diagram of a pixel driving circuit of an array base plate according to an embodiment of the present application.

An embodiment of the present application provides an array base plate, including:

- a substrate;
- a plurality of sub-pixels that are located on the substrate and arranged in array; and
- a plurality of gate lines WS and a plurality of data lines DL, wherein the plurality of gate lines WS intersect with the plurality of data lines DL, each of the sub-pixels (for example, P1 or P2) is located at a position limited by two adjacent gate lines WS and two adjacent data lines DL, and each of the sub-pixels includes a pixel driving circuit and a light emitting device that are electrically connected; wherein, referring to FIG. 1 and FIG. 7, the pixel driving circuit includes:
- a drive module 2 electrically connected to a first node G, a second node S and an anode of the light emitting device 6, wherein the drive module 2 is configured for conducting a path between the second node S and the anode under control of a voltage of the first node G, and generating a current in the path to make the light emitting device 6 emit light; the second node S is coupled to the first power signal line ELVDD; and
- a first control module 5 electrically connected to a first control signal line AZ, a second power signal line VSS and the anode of the light emitting device 6, wherein the first control module 5 is configured for transferring a second power signal transmitted by the second power signal line VSS to the anode under control of a first control signal transmitted by the first control signal line AZ;

wherein the pixel driving circuit further includes an auxiliary anode ANF, the auxiliary anode ANF is located between the anode AN and the substrate, and the auxiliary anode ANF is electrically connected to the anode AN; the first power signal line ELVDD includes a first part ELVDD-1 and a second part ELVDD-2 that are electrically connected, the first part ELVDD-1 of the first power signal line and the first control signal line AZ are arranged on a same layer, the second part ELVDD-2 of the first power signal line and the auxiliary anode ANF are arranged on a same layer, and the first control signal line AZ and the auxiliary anode ANF are located in different layers.

For clarity, in FIG. 7, a part of the structure of the pixel driving circuit is simplified or omitted to reflect the layout of the main components and signal lines in the pixel driving circuit. This is hereby explained.

It should be noted that the first node G and the second node S in the above pixel driving circuit do not actually exist, but are concepts proposed for the convenience of describing the connection relationship of the circuit. This is hereby explained.

For example, the drive module 2 includes a driving transistor DMOS, and the first control module 5 includes a third transistor T3.

In exemplary embodiments, the above-mentioned substrate may be a rigid substrate, such as a silicon substrate, or a glass substrate. The above substrate may be a flexible substrate, such as a flexible polyimide or other flexible polymer films.

The materials of the above-mentioned silicon substrate include silicon materials, such as monocrystalline silicon or polycrystalline silicon. Before preparing the pixel driving circuit, N-type ion implantation may be performed on a silicon substrate to form an N-well (NW) region, then P-type ion implantation is performed in the N-well region NW to form an SP region, which is used to form a channel region of the transistor on the SP region. There is no restriction on the specific treatment process of the silicon substrate here, and only the type of ion implantation in different regions on the silicon substrate is explained using the example of preparing P-type Metal Oxide Semiconductor (PMOS) transistor. When the transistor is NMOS transistor, the specific treatment process of the silicon substrate is similar to the steps of the above treatment process, but the polarity of ion implantation in each step is opposite. The specific treatment process of the silicon substrate can refer to the introduction in related art, and will not be repeated here.

There is no restriction on the display colors of the sub-pixels mentioned above;

In some embodiments, the display colors of the sub-pixels may be the same, for example, all sub-pixels are displayed in blue, and for another example, all sub-pixels are displayed in white.

In some other embodiments, the array base plate may include a plurality of sub-pixels with different display colors. For example, the array base plate may simultaneously include three types of sub-pixels that display red, blue, and green. For another example, the array base plate can include four types of sub-pixels that display red, blue, green, and white simultaneously.

There are no restrictions on the types of the light emitting device 6 mentioned above.

For example, the above light emitting device 6 may be a light emitting diode or the like. The light emitting diode may be an organic light emitting diode (OLED), a quantum dot light-emitting diode (QLED), a micro light emitting diode (Micro-LED) or the like.

For example, the first power signal line ELVDD may continuously provide a high-level voltage signal, and a signal provided by the first power signal line ELVDD is called the ELVDD signal. The second power signal line VSS can continuously provide a low-level voltage signal, and a signal provided by the second power signal line VSS is called the VSS signal.

"Arranged on the same layer" refers to a structure formed by patterning two (or more) structures through the same patterning process, and their materials can be the same or different. For example, the materials used to form precursors of multiple structures arranged on the same layer are the same, and the resulting materials can be the same or different.

For example, the first part ELVDD-1 of the first power signal line and the first control signal line AZ are arranged on the same layer and made of the same material. Among them, the first control signal line AZ can be the reset signal line.

For example, the second part ELVDD-2 of the first power signal line and the auxiliary anode ANF are arranged on the same layer and made of the same material.

In the embodiment of the present application, the first power signal line ELVDD includes the first part ELVDD-1 and second part ELVDD-2 that are electrically connected, the first part ELVDD-1 of the first power signal line and the first control signal line AZ are arranged on the same layer, the second part ELVDD-2 of the first power signal line and the auxiliary anode ANF are arranged on the same layer, and the film layer where the auxiliary anode ANF is located is different from the film layer where the first control signal line AZ is located. In this way, it can significantly improve the conductivity of the first power signal line ELVDD, reduce the probability of occurring the IR Drop problem of the first power signal line ELVDD, improve the stability of the signal provided by the first power signal line ELVDD to the pixel driving circuit of each sub-pixel, thereby improving the stability and uniformity of the luminous brightness of each sub-pixel and improving the display effect.

In some embodiments of the present application, as shown in FIG. 1, the pixel driving circuit further includes a second control module 4;

the second control module 4 is electrically connected to the first power signal line ELVDD, a second control signal line DS and the drive module 2, and configured for transferring a first power signal transmitted by the first power signal line ELVDD to the drive module 2 under control of a second control signal transmitted by the second control signal line, and assisting in generating the current in the path to make the light emitting device 6 emit light; wherein the voltage of the first power signal line is greater than the voltage of the second power signal line;

wherein an orthographic projection of the second control module 4 on the substrate overlaps with an orthographic projection of the second part ELVDD-2 of the first power signal line on the substrate.

For example, the second control module 4 includes a second transistor T2.

The above "overlap" refers to: at least partially overlapping, and the relevant descriptions in the following text of the specification are similar in meaning and will not be repeated here.

For example, the orthographic projection of the second control module 4 on the substrate are located within the orthographic projection of the second part ELVDD-2 of the first power signal line on the substrate.

In the embodiment of the present application, the orthographic projection of the second control module 4 on the substrate overlaps with the orthographic projection of the second part ELVDD-2 of the first power signal line on the substrate, which greatly increases the size of the second part ELVDD-2 of the first power signal line. In this way, it can significantly improve the conductivity of the first power signal line ELVDD, reduce the probability of occurring the IR Drop problem of the first power signal line ELVDD, improve the stability of the signal provided by the first power signal line ELVDD to the pixel driving circuit of each sub-pixel, thereby improving the stability and uniformity of the luminous brightness of each sub-pixel and improving the display effect.

In some embodiments of the present application, as shown in FIG. 1, the pixel driving circuit further includes an input module 1; the input module 1 is electrically connected to the gate lines WS, the data lines DL and the first node G, and configured for writing data signals transmitted by the data lines DL into the first node G under control of scan signals transmitted by the gate lines WS;

wherein, as shown in FIG. 7, an orthographic projection of the input module 1 on the substrate overlaps with orthographic projections of the gate lines WS on the substrate, and the orthographic projection of the input module 1 on the substrate overlaps with an orthographic projection of the second control signal line DS on the substrate.

For example, the input module 1 includes a first transistor T1.

For example, as shown in FIG. 7, the orthographic projection of the input module 1 on the substrate partially overlaps with the orthographic projections of the gate lines WS on the substrate, and the orthographic projection of the input module 1 on the substrate partially overlaps with the orthographic projection of the second control signal line DS on the substrate.

In some embodiments of the present application, as shown in FIG. 7, the input module 1 and the second control module 4 are located at a same side of the drive module 2, and the first control module 5 is located at a side of the drive module 2 away from the second control module 4.

For example, the input module 1 includes the first transistor T1, the drive module 2 includes a driving transistor DMOS, the second control module 4 includes the second transistor T2, and the first control module 5 includes a third transistor T3;

- a gate of the first transistor T1 is electrically connected to the gate line WS, a source of the first transistor T1 is electrically connected to the data line DL, and a drain of the first transistor T1 is electrically connected to a gate of the driving transistor DMOS;
- a gate of the second transistor T2 is electrically connected to the second control signal line DS, a source of the second transistor T2 is electrically connected to the first power signal line ELVDD, and a drain of the second transistor T2 is electrically connected to a source of the driving transistor DMOS; and
- a gate of the third transistor T3 is electrically connected to the first control signal line AZ, a source of the third transistor T3 is electrically connected to a drain of the driving transistor DMOS, and a drain of the third transistor T3 is electrically connected to the second power signal line VSS.

In exemplary embodiments, in order to save the layout space of various components and wiring in the pixel driving circuit, a source (or drain) of one transistor can be set to be shared with the source (or drain) of another transistor.

For example, the drain of the second transistor T2 and the source of the driving transistor DMOS can be set as an integrated structure. For example, it is possible to set the drain of the second transistor T2 to share the same structure as the source of the driving transistor DMOS.

For example, the source of the third transistor T3 and the drain of the driving transistor DMOS can be set as the integrated structure. For example, it is possible to set the source of the third transistor T3 to share the same structure as the drain of the driving transistor DMOS.

For example, the drains of two third transistor T3 in two adjacent sub-pixels can be set as the integrated structure. It is possible to set the drains of the two third transistor T3 in two adjacent sub-pixels to share the same structure.

It should be noted that the integrated structure refers to a structure formed by using the materials of the same precursor in the same preparation process. The final materials of the two structures corresponding to the integrated structure can be the same or different. Sharing the same structure refers to sharing structures which are formed by using the same material in the same preparation process, and the final materials of them are the same.

There is no restriction on the types of the above-mentioned transistors here.

For example, each transistor can be a P-type MOSFET (Metal-Oxide-Semiconductor Field-Effect Transistor). For example, each transistor can be an N-type MOSFET. For example, some transistors are the P-type MOSFETs, and some transistors are the N-type MOSFETs. For example, the driving transistor DMOS is the P-type MOSFET, and the other transistors are the N-type MOSFETs. For example, the driving transistor DMOS is the N-type MOSFET, and the other transistors are the P-type MOSFETs.

In the design layout of the pixel driving circuit provided in the specification, taking the third transistor T3 being the N-type MOSFET, and other transistors being the P-type MOSFETs as an example to illustrate. On this basis, the design layout of the pixel driving circuit evolved through the transformation in the types of the transistors is within the scope of protection of the present application.

In some embodiments of the present application, as shown in FIG. 7, the pixel driving circuit further includes a first wiring M2-1, an extension direction of the first wiring M2-1 intersects with an extension direction of the first control signal line AZ, the first wiring M2-1 is electrically connected to the gate of the third transistor T3 and the first control signal line AZ, and the first wiring M2-1 and the data lines DL are arranged on a same layer.

For example, as shown in FIG. 7, the first wiring M2-1 and the data lines DL are all located in the first conductive layer M1.

In some embodiments of the present application, as shown in FIG. 7, the orthographic projection of the gate of the third transistor T3 on the substrate partially overlaps with an orthographic projection of the first control signal line AZ on the substrate, an orthographic projection of the first wiring M2-1 on the substrate partially overlaps with the orthographic projection of the gate of the third transistor T3 on the substrate, the orthographic projection of the first wiring M2-1 on the substrate extends from a side of the gate of the third transistor T3 close to the first control signal line AZ to a side of the gate of the third transistor T3 away from the first control signal line AZ, and the orthographic projection of the first wiring M2-1 on the substrate overlaps with an orthographic projection of an active region of the third transistor T3 on the substrate.

In some embodiments of the present application, as shown in FIG. 7, the pixel driving circuit further includes a second wiring M2-2, an extension direction of the second wiring M2-2 is consistent with an extension direction of the data lines DL, the second wiring M2-2 is electrically connected to the source of the second transistor T2 and the first power signal line ELVDD, and the second wiring M2-2 and the data lines DL are arranged on the same layer.

For example, as shown in FIG. 7, the second wiring M2-2 and the data lines DL are all located in the first conductive layer M1.

For example, as shown in FIG. 7, the second wiring M2-2 is electrically connected to the first part ELVDD-1 of the first power signal line, and the source of second transistor T2 is electrically connected to the first part ELVDD-1 of the first power signal line by the second wiring M2-2.

For example, as shown in FIG. 7, the extension direction of the second wiring M2-2 intersects with an extension direction of the gate lines WS, and an orthographic projection of the second wiring M2-2 on the substrate partially overlaps with the orthographic projection of the gate lines WS on the substrate; and the orthographic projection of the second wiring M2-2 on the substrate extends from a position where an orthographic projection of the source of the second transistor T2 on the substrate is located to a position where an orthographic projection of the first part ELVDD-1 of the first power signal line on the substrate is located.

In exemplary embodiments, the extension direction of the second wiring M2-2 may be consistent with the extension direction of the data lines DL, and cross the gate lines WS to be electrically connected to the first part ELVDD-1 (such as the horizontally extended line segment in the first part of the first power signal line in FIG. 7) of the first power signal line. In some other embodiments, the extension direction of the second wiring M2-2 may intersect with the extension direction of the data lines DL, and cross the gate lines WS to be electrically connected to the first part ELVDD-1 (such as the vertically extended line segment in the first part of the first power signal line in FIG. 7) of the first power signal line. In the specification, taking the extension direction of the second wiring M2-2 being consistent with that of the data lines DL, and crossing the gate lines WS to be electrically connected to the first part ELVDD-1 (such as the horizontally extended line segment in the first part of the first power signal line in FIG. 7) of the first power signal line as an example to illustrate.

In some embodiments of the present application, as shown in FIG. 7, the orthographic projection of the second control signal line DS on the substrate overlaps with orthographic projections of the gate of the first transistor T1 and the gate of the second transistor T2 on the substrate; and the orthographic projection of the gate lines WS on the substrate overlaps with the orthographic projection of the gate of the first transistor T1 on the substrate, and the orthographic projection of the gate lines WS on the substrate overlaps with an orthographic projection of an active region of the first transistor T1 on the substrate.

In the specification, the transistor refers to a component that includes at least three terminals: a gate electrode (also known as the gate), a drain electrode (also known as the drain), and a source electrode (also known as the source). The transistor has a channel region (active region) between the drain and the source, and the current can flow through the drain, the channel region, and the source. Note that in the specification, the channel region refers to the region through which the current mainly flows. In the case of using the transistors with opposite polarity or changing in the direction of the current during the circuit operation, the functions of the "source" and the "drain" are sometimes swapped with each other. Therefore, in the specification, the "source" and the "drain" can be swapped with each other.

In some embodiments of the present application, as shown in FIG. 7, in a region where the same second control signal line DS is located, a distance h1 from the gate of the first transistor T1 along a direction parallel to the data lines DL to the gate of the driving transistor DMOS is greater than a distance h2 from the gate of the second transistor T2 along the direction parallel to the data lines DL to the gate of the driving transistor DMOS.

In some embodiments of the present application, as shown in FIG. 7, in a region where the same row of sub-pixels are located, along a direction parallel to the data lines DL, a minimum distance h3 from a part line segments of the second control signal line DS overlapping with the gate of the first transistor T1 to the gate lines WS is less than a minimum distance h4 from a part line segments of the second control signal line DS overlapping with the gate of the second transistor T2 to the gate lines WS.

Figure 28:
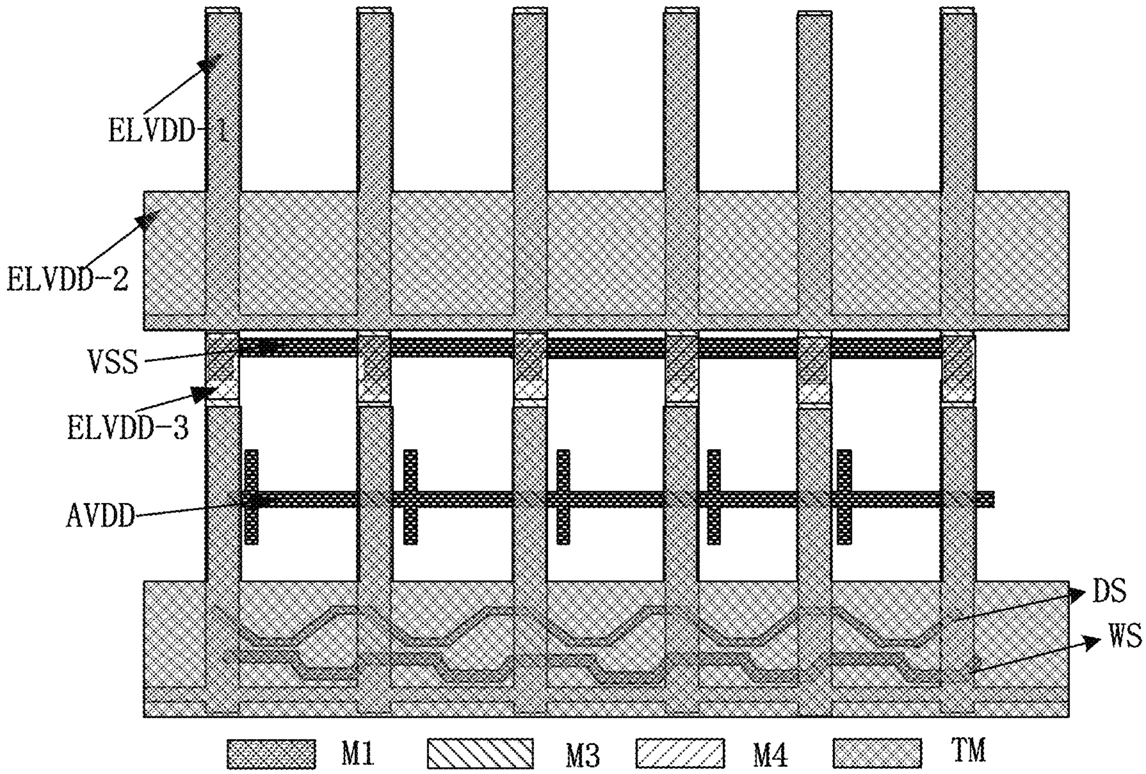
FIG. 28 is top-view structural diagram of a first power signal line, a second power signal line, a third power signal line, a first control signal and gate lines according to an embodiment of the present application.

In some embodiments of the present application, as shown in FIG. 7, orthographic projections of the data lines DL on the substrate overlap with an orthographic projection of the first part ELVDD-1 of the first power signal line on the substrate; and as shown in FIG. 7 and FIG. 28, orthographic projections of the first transistor T1, the second transistor T2, the second control signal line DS and the gate lines WS on the substrate are located within the orthographic projection of the second part ELVDD-2 of the first power signal line on the substrate.

In the embodiments of the present application, the orthographic projections of the data lines DL on the substrate overlap with the orthographic projection of the first part ELVDD-1 of the first power signal line on the substrate, and the orthographic projections of the first transistor T1, the second transistor T2, the second control signal line DS and the gate lines WS on the substrate are located within the orthographic projection of the second part ELVDD-2 of the first power signal line on the substrate, respectively. In one hand, it can significantly improve the conductivity of the first power signal line ELVDD, and reduce the probability of occurring the IR Drop problem of the first power signal line ELVDD. In another hand, through overlapping arrangement, it can greatly save the design space of the pixel driving circuit, and it is more conducive to preparing display products with high PPI (Pixels Per Inch).

Figure 20:
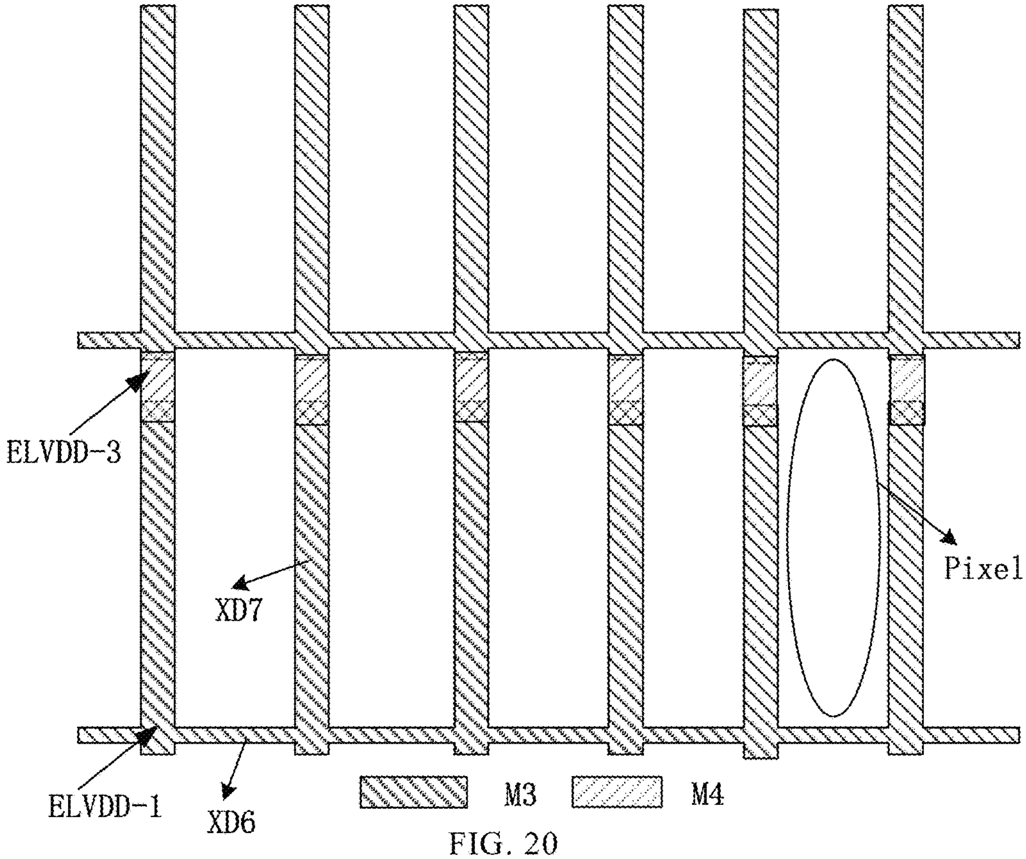
FIG. 20 is a top-view structural diagram of a first part and a second part of a first power signal line according to an embodiment of the present application.

In some embodiments of the present application, as shown in FIG. 20, the first power signal line ELVDD further includes a third part ELVDD-3, an extension direction of the third part ELVDD-3 of the first power signal line intersects with the extension direction of the first control signal line AZ, and the third part ELVDD-3 of the first power signal line connects the first parts ELVDD-1 of the first power signal lines of the sub-pixels in two adjacent rows together; and an orthographic projection of the third part ELVDD-3 of the first power signal line on the substrate partially overlaps with the orthographic projections of the data lines DL on the substrate and an orthographic projection of the first control signal line AZ on the substrate, respectively.

In some embodiments of the present application, orthographic projections of the first part ELVDD-1 of the first power signal line and the third part ELVDD-3 of the first power signal line on the substrate are a shape of a grid, and the sub-pixels Pixel are located in an enclosed region limited by the grid.

For example, graphs formed by the first part ELVDD-1 of the first power signal line and the third part ELVDD-3 of the first power signal line are multiple rings that are connected together.

For example, the ring may be a square ring.

Since the sub-pixels are located in the enclosed region limited by the grid, all components in the pixel driving circuit are located in the grid. In this way, the ring formed by the first part ELVDD-1 of the first power signal line and the third part ELVDD-3 of the first power signal line separates the pixel driving circuits of two adjacent sub-pixels, which shields the signals of the pixel driving circuits of two adjacent sub-pixels and avoids the signal crosstalk between two adjacent sub-pixels, improves the driving stability of the pixel driving circuits, and improves the display performance.

In order to save the layout space of various components and wiring in the pixel driving circuit, it is possible to set that the source (or drain) of one transistor is shared with the source (or drain) of another transistor.

Figure 9:
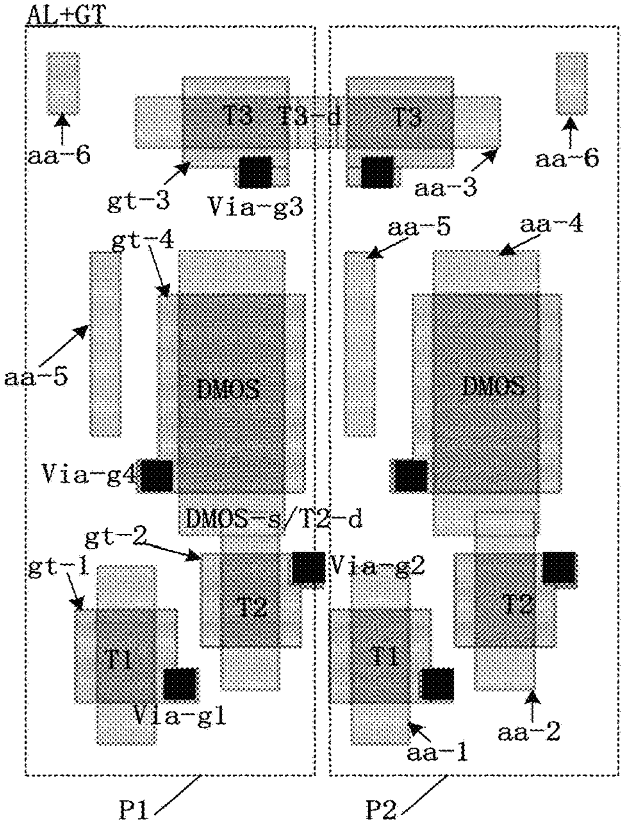
FIG. 9 is a top-view structural diagram of a semiconductor layer and a gate layer stacked on an array base plate according to an embodiment of the present application.

For example, in the same sub-pixel, as shown in FIG. 9, the source of the driving transistor DMOS is shared with the drain of the second transistor T2 (a position marked as DMOS-s/T2-*d*). In the same row of the sub-pixels perpendicular to the extension direction of the data lines DL, two sub-pixels are divided into one group, and the drains of the two third transistor T3 in the same group of the sub-pixels are shared (a position marked as T3-*d*).

Figure 6:
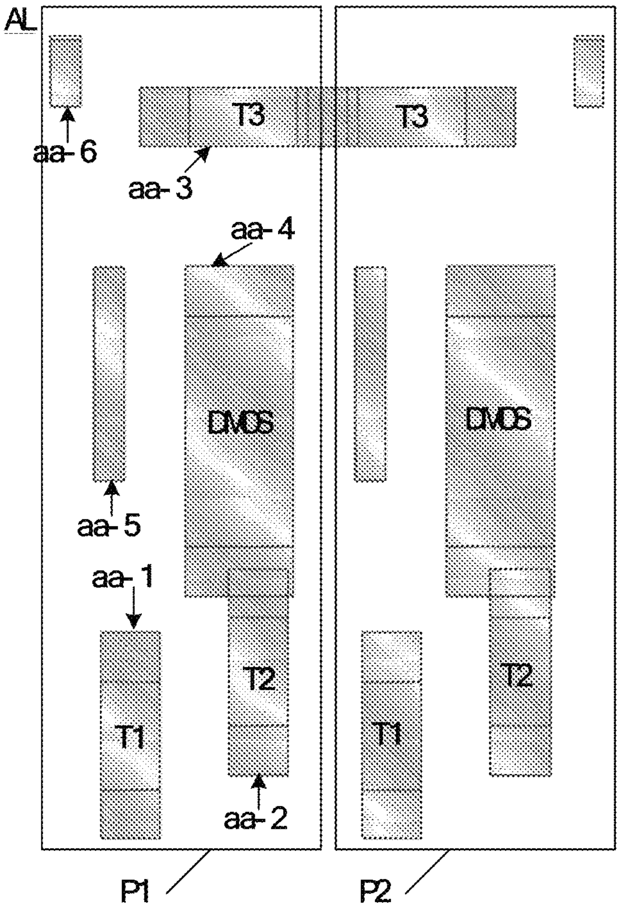
FIG. 6 is a top-view structural diagram of a semiconductor layer of an array base plate according to an embodiment of the present application.

In some embodiments of the present application, the array base plate includes a semiconductor layer AL located on the substrate, as shown in FIG. 6, the semiconductor layer AL includes a first part aa-1, a second part aa-2, a third part aa-3, a fourth part aa-4, a fifth part aa-5 and a sixth part aa-6;

- an area of an orthographic projection of the fourth part aa-4 of the semiconductor layer AL on the substrate is greater than that of orthographic projections of the other parts of the semiconductor layer on the substrate;
- the first part aa-1 of the semiconductor layer AL includes the source, the drain and an active region of the first transistor T1, the second part aa-2 of the semiconductor layer AL includes the source, the drain and an active region of the second transistor T2, the third part aa-3 of the semiconductor layer AL includes the source, the drain and an active region of the third transistor T3, the fourth part aa-4 of the semiconductor layer AL includes the source, the drain and an active region of the driving transistor DMOS, and the fifth part aa-5 and the sixth part aa-6 are both electrically connected to the substrate.

For example, graphs of the orthographic projections of the first part aa-1, the second part aa-2, the third part aa-3, the fourth part aa-4, the fifth part aa-5, and the sixth part aa-6 of the semiconductor layer AL on the substrate all include quadrilateral.

For example, the extension directions of the first part aa-1, the second part aa-2, the fourth part aa-4, the fifth part aa-5, and the sixth part aa-6 of the semiconductor layer AL are the same, and the extension direction of the third part aa-3 of the semiconductor layer AL intersects with that of the other parts of the semiconductor layer AL.

Among them, in one sub-pixel, for example, in a region where the sub-pixel P1 is located, the second part aa-2 of the semiconductor layer AL and the fourth part aa-4 of the semiconductor layer AL are an integrated structure. In the same row of sub-pixels perpendicular to the extension direction of the data lines DL, two sub-pixels are divided into one group (for example, including the sub-pixel P1 and the sub-pixel P2), in a region where the same group of sub-pixels are located, two third parts aa-3 of the semiconductor layers AL are an integrated structure.

There is no restriction on the specific material of the aforementioned semiconductor layer AL. For example, the material of the semiconductor layer AL may be silicon material, such as polycrystalline silicon.

For example, in the region where the same group of sub-pixels are located (such as including the sub-pixel P1 and the sub-pixel P2), two third transistor T3 are symmetrically arranged, and the two sixth parts aa-6 of the semiconductor layer AL are symmetrically arranged.

For example, when the third transistor T3 is an N-type transistor and all other transistors are P-type transistors, the substrate in the region where the third transistor T3 is located is a P-type silicon substrate, and the substrate in the region where other transistors are located is an N-type silicon substrate. Moreover, the sixth part aa-6 of the semiconductor layer AL which is arranged close to the third transistor T3 is electrically connected to the region of the P-type silicon substrate, the fifth part aa-5 of the semiconductor layer AL which is arranged close to the driving transistor DMOS is electrically connected to the region of the N-type silicon substrate.

Figure 8:
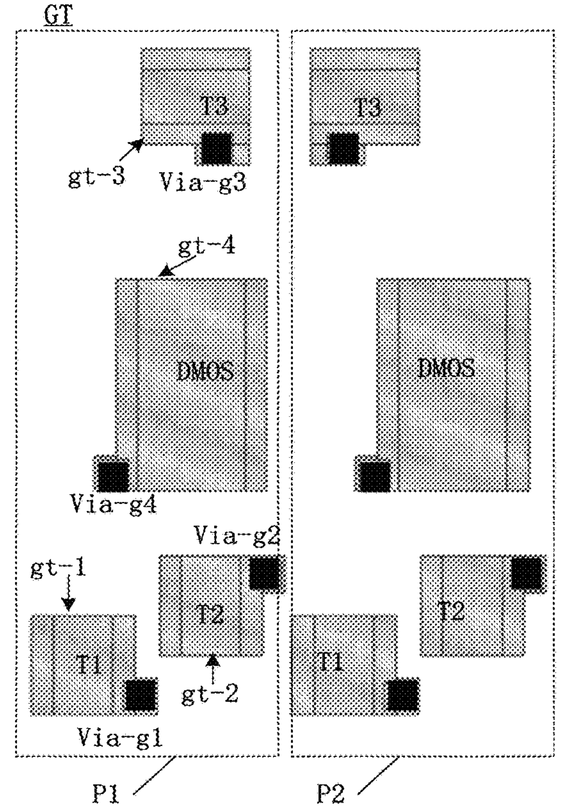
FIG. 8 is a top-view structural diagram of a gate layer according to an embodiment of the present application.

In some embodiments of the present application, as shown in FIG. 8, the array base plate further includes a gate layer GT located at a side of the semiconductor layer AL away from the substrate.

The gate layer GT includes the gates of the transistors, for example, the gate layer GT includes the gate gt-1 of the first transistor T1, the gate gt-2 of the second transistor T2, the gate gt-3 of the third transistor T3, and the gate gt-4 of the driving transistor DMOS. An area of an orthographic projection of the gate of the driving transistor DMOS on the substrate is greater than areas of orthographic projections of the gates of other transistors on the substrate.

An orthographic projection of the gate layer GT on the substrate partially overlaps with an orthographic projection of the semiconductor layer AL on the substrate; regions of the semiconductor layer AL that overlap with the orthographic projection of the gate layer GT on the substrate are the active regions (channel region) of the transistors, regions of the semiconductor layer AL that do not overlap with the orthographic projection of the gate layer GT on the substrate are the sources or the drains of the transistors; an area of an orthographic projection of the gate of the driving transistor DMOS on the substrate is greater than areas of orthographic projections of the gates of other transistors on the substrate.

For example, FIG. 9 is a top-view structural diagram of a semiconductor layer AL and a gate layer after being stacked. The upper side and the lower side of the active region of each of the first transistor T1, the second transistor T2, and the driving transistor DMOS are respectively the source and drains. The left side and the right side of the active region of the third transistor T3 are respectively the source and the drain.

For example, the driving transistor DMOS is located between the second transistor T2 and the third transistor T3.

The first transistor T1 is adjacent to the second transistor T2 and the setting positions of the first transistor T1 and the second transistor T2 are staggered up and down. The first transistor T1 is located on the side of the driving transistor DMOS away from the third transistor T3.

In exemplary embodiments, doping treatment can be performed on the source and the drain of each transistor, to improve its conductivity, and doping elements may be boron, and the like.

For example, as shown in FIG. 8, the black boxes marked on the gates of each transistor are the connection holes Via of the gates of each transistor, and each transistor is electrically connected to the wiring or other components through its connection holes. For example, a first connection hole Via-g1 of the gate layer GT facing upwards is correspondingly provided at the position where the gate gt-1 of the first transistor T1 is located, a second connection hole Via-g2 of the gate layer GT facing upwards is correspondingly provided at the position where the gate gt-2 of the second transistor T2 is located, a third connection hole Via-g3 of the gate layer GT facing upwards is correspondingly provided at the position where the gate gt-3 of the third transistor T3 is located, and a fourth connection hole Via-g4 of the gate layer GT facing upwards is correspondingly provided at the position where the gate gt-4 of the driving transistor DMOS is located. The above-mentioned "the connection hole of the gate layer facing upwards" refers to the connection holes between the gate layer GT and other film layers at the side of the gate layer GT away from the substrate.

For example, the above-mentioned connection holes are filled with conductive materials, such as tungsten metal (such as W-Via).

In some embodiments of the present application, the array base plate further includes a gate insulation layer (GI), which covers the gate layer GT, and the gate insulation layer (GI) is located between the gate layer GT and the first conductive layer M1.

Figure 10:
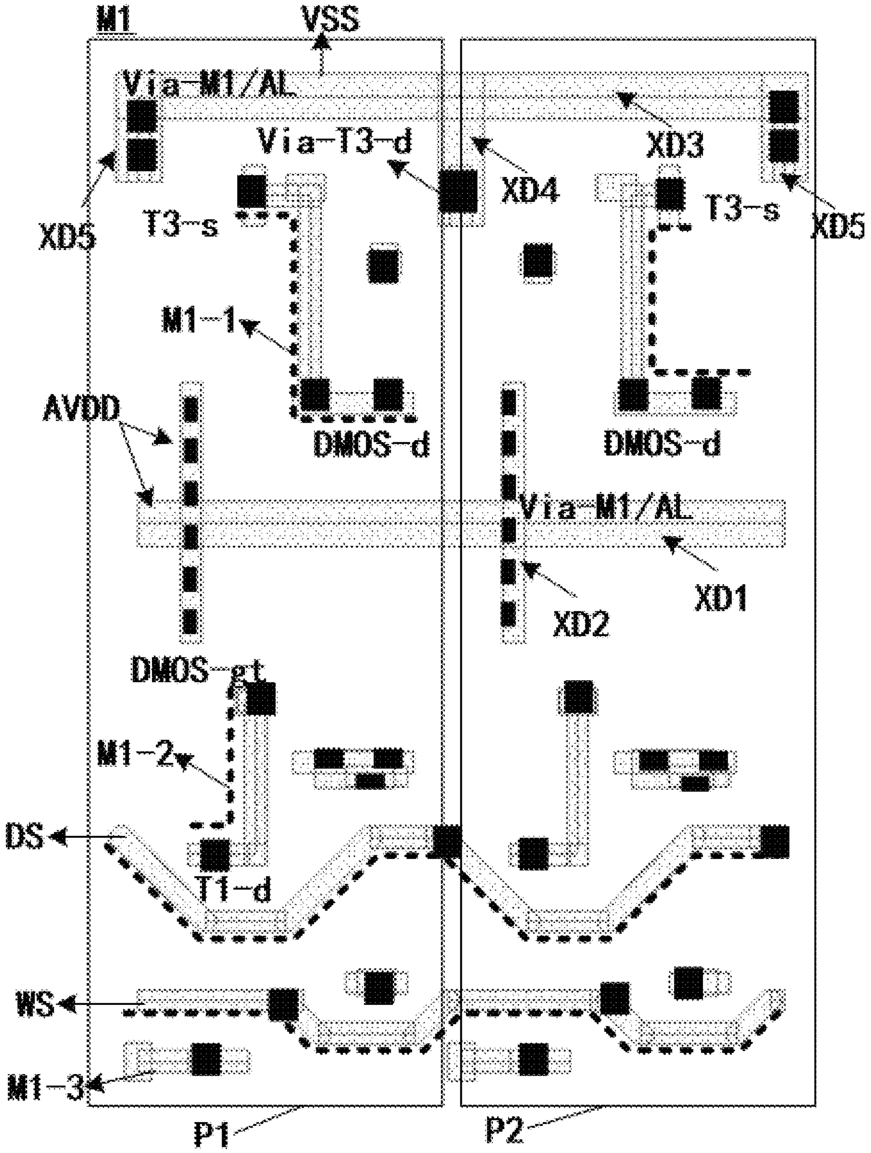
FIG. 10 is a top-view structural diagram of a first conductive layer according to an embodiment of the present application.
Figure 11:
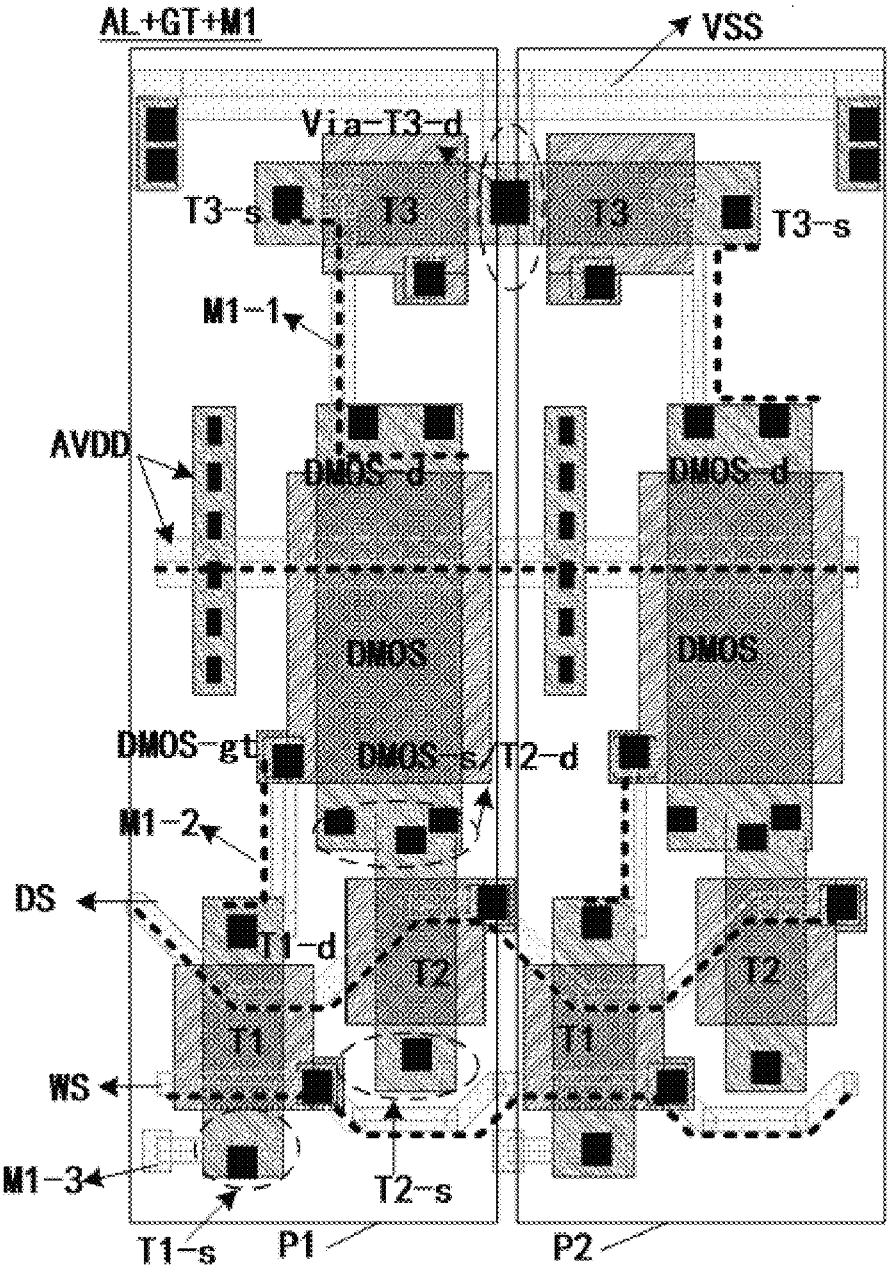
FIG. 11 is a top-view structural diagram of a semiconductor layer, a gate layer, and a first conductive layer stacked on an array base plate according to an embodiment of the present application.

In some embodiments of the present application, as shown in FIG. 10 and FIG. 11, the array base plate further includes a first conductive layer M1 located at a side of the gate layer GT away from the substrate; among them, FIG. 11 is a top-view structural diagram of a semiconductor layer AL, a gate layer GT, and a first conductive layer M1 after being stacked together;

- the first conductive layer M1 includes a third power signal line AVDD, the gate lines WS, the second control signal line DS and the second power signal line VSS; and the voltage of the third power signal (AVDD signal) transmitted in the third power signal line AVDD is greater than the voltage of the second power signal (VSS signal);
- the third power signal line AVDD is electrically connected to the fifth part aa-5 of the semiconductor layer AL, and the second power signal line VSS is electrically connected to the sixth part aa-6 of the semiconductor layer AL.

There is no restriction on the relationship between the voltage of the third power signal (AVDD signal) transmitted in the third power signal line AVDD and the voltage of the first power signal (ELVDD signal) transmitted in the first power signal line ELVDD. The specific relationship can be determined based on the design of the circuit in the array base plate.

Figure 27:
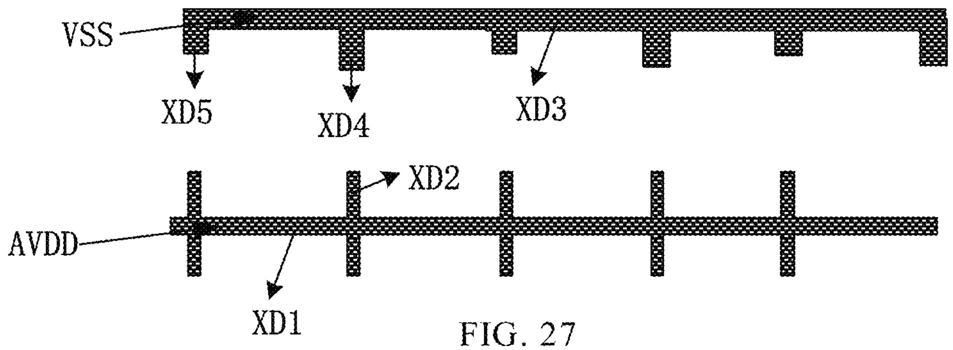
FIG. 27 is top-view structural diagram of a second power signal line and a third power signal line in a region of the same row of sub-pixels according to an embodiment of the present application.

For example, as shown in FIG. 11 and FIG. 27, the orthographic projection of the third power supply signal line AVDD on the substrate partially overlaps with the orthographic projection of the driving transistor DMOS on the substrate.

For example, as shown in FIG. 11, the second power signal line VSS is located on the side of the third transistor T3 away from the driving transistor DMOS. Since the second power signal line VSS is electrically connected to the drain of the third transistor T3, it is possible to set the second power signal line VSS adjacent to the third transistor T3 to save design space.

There is no restriction on the sizes of the graphic areas of the fifth part aa-5 of the semiconductor layer AL and the sixth part aa-6 of the semiconductor layer AL mentioned above. For example, the graphic area of the fifth part aa-5 of the semiconductor layer AL is greater than the graphic area of the sixth part aa-6 of the semiconductor layer AL. For example, the graphic area of the fifth part aa-5 of the semiconductor layer AL is less than or equal to the graphic area of the sixth part aa-6 of the semiconductor layer AL. The specific requirements can be determined based on the electrical connection requirements of the design space.

Taking the substrate being the silicon substrate as an example, to illustrate the requirements of different types of transistors (MOS transistors) for the substrate: in the case of the third transistor T3 being an N-type transistor and the other transistors being P-type transistors, the silicon substrate in the region where the third transistor T3 is located is a P-type silicon substrate, and the silicon substrate in the region where the other transistors are located is an N-type silicon substrate. The fifth part aa-5 of the semiconductor layer AL is electrically connected to the region of the N-type silicon substrate, the sixth part aa-6 of the semiconductor layer AL is electrically connected to the region of the P-type silicon substrate. Then, by setting that the fifth part aa-5 of the semiconductor layer AL is electrically connected to the third power signal line AVDD, and setting that the sixth part aa-6 of the semiconductor layer AL is electrically connected to the second power signal line VSS, the third power signal line AVDD provides AVDD potential to the region of the N-type silicon substrate, and the second power signal line VSS provides VSS potential to the region of the P-type silicon substrate. Among them, the AVDD potential is greater than the VSS potential. For example, the AVDD potential can be a positive voltage potential, the VSS potential can be a ground potential or a negative voltage potential. For example, the AVDD potential can be a high-level potential, and the VSS potential can be a low-level potential.

In some embodiments of the present application, as shown in FIG. 10 and FIG. 27, in a region where the same row of sub-pixels perpendicular to the extension direction of the data lines DL are located, the third power signal line AVDD includes a first line segment XD1 and a plurality of second line segments XD2, the first line segment XD1 is connected to each second line segment XD2, the second line segments XD2 are electrically connected to the fifth part aa-5 of the semiconductor layer AL, an extension direction of the first line segment XD1 intersects with the extension direction of the data lines DL, an extension direction of each second line segment XD2 is consistent with the extension direction of the data lines DL, an orthographic projection of the first line segment XD1 on the substrate partially overlaps with an orthographic projection of the driving transistor DMOS on the substrate, orthographic projections of the second line segments XD2 on the substrate overlaps with an orthographic projection of the fifth part aa-5 of the semiconductor layer AL on the substrate.

For example, that the extension directions are consistent may include the extension directions being parallel. The description in the following text for the extension directions being consistent is similar to the meaning here and will not be repeated.

It should be noted that the term "parallel" mentioned in the specification refers to a broad sense of parallelism, which refers to the state where two straight lines form an angle of being greater than −10° and less than 10°. Therefore, it also includes states where the angle is greater than −5° and less than 5°.

For example, as shown in FIG. 27, the shape of the orthographic projection of the third power signal line AVDD on the substrate can be similar to that of a fence.

In some embodiments of the present application, as shown in FIG. 10 and FIG. 27, in the region where the same row of sub-pixels perpendicular to the extension direction of the data lines DL are located, the second power signal line VSS includes a third line segment XD3, a plurality of fourth line segments XD4 and a plurality of fifth line segment XD5, the third line segment XD3 is connected to each fourth line segment XD4 and each fifth line segment XD5, the fourth line segments XD4 are electrically connected to the drain of the third transistor T3, the fifth line segments XD5 are electrically connected to the sixth part aa-6 of the semiconductor layer AL, extension directions of each fourth line segment XD4 and each fifth line segment XD5 are both consistent with the extension direction of the data lines DL, an extension direction of the third line segment XD3 intersects with the extension direction of the data lines DL, an orthographic projection of the fifth line segment XD5 on the substrate overlaps with an orthographic projection of the sixth part aa-6 of the semiconductor layer AL on the substrate.

Figure 13:
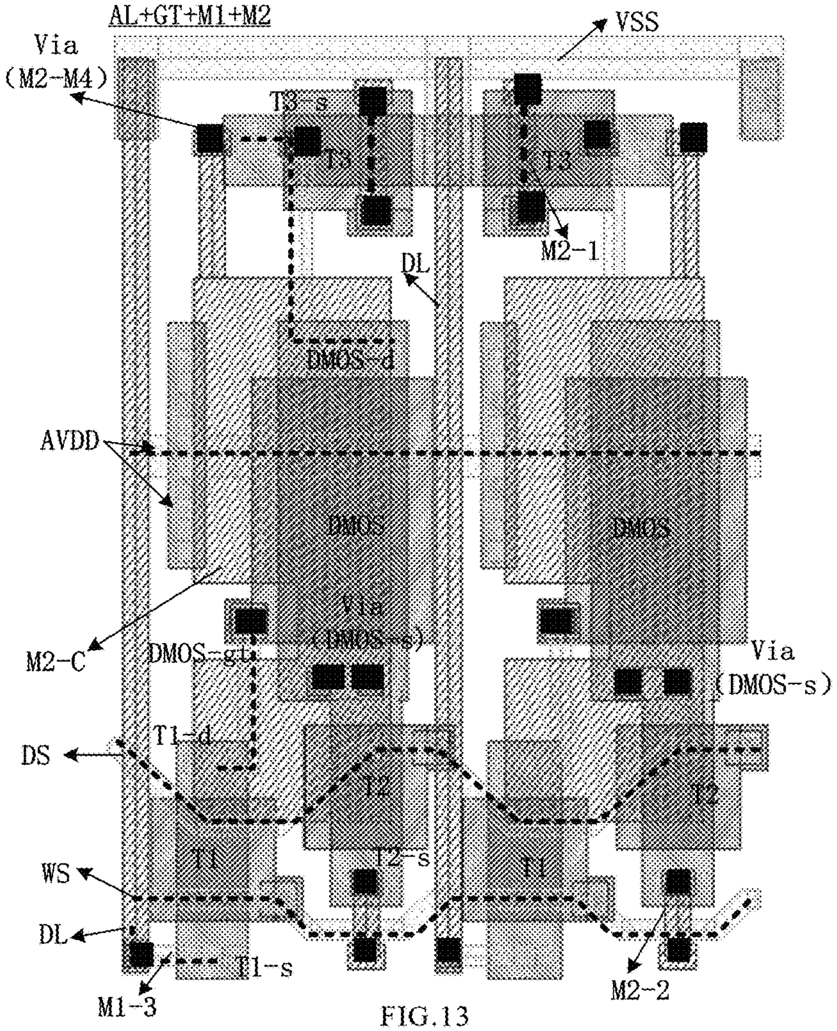
FIG. 13 is a top-view structural diagram of a semiconductor layer, a gate layer, a first conductive layer, and a second conductive layer stacked on an array base plate according to an embodiment of the present application.

In some embodiments of the present application, as shown in FIG. 10, the first conductive layer M1 further includes a first connecting part M1-1, a second connecting part M1-2 and a third connecting part M1-3;

- as shown in FIG. 11, the first connecting part M1-1 is electrically connected to the source of the third transistor T3 and the drain of the driving transistor DMOS;
- as shown in FIG. 11, the second connecting part M1-2 is electrically connected to the gate of the driving transistor DMOS and the drain of the first transistor T1; and
- combined with FIG. 7, FIG. 11 and FIG. 13, the third connecting part M1-3 is electrically connected to the source of the first transistor T1 and the data lines DL; and an orthographic projection of the third connecting part M1-3 on the substrate overlaps with an orthographic projection of the first part ELVDD-1 of the first power signal line on the substrate.

In exemplary embodiments, the positions marked with the black boxes are connection holes. Among them, as shown in FIG. 10 and FIG. 11, each connection hole is a connection hole of the first conductive layer M1 facing downwards, for example, a connection hole between the first conductive layer M1 and the semiconductor layer AL or a connection hole between the first conductive layer M1 and the gate layer GT.

For example, the connection hole Via-M1/AL set on the second segment XD2 of the third power signal line AVDD is the connection hole between the second segment XD2 and the fifth part aa-5 of the semiconductor layer AL.

For example, the connection hole Via-T3-*d* set on the fourth segment XD4 of the second power signal line VSS is the connection hole between the second power signal line VSS and the drain of the third transistor T3.

For example, the connection hole Via-M1/AL set on the fifth segment XD5 of the second power signal line VSS is the connection hole between the second power signal line VSS and the sixth part aa-6 of the semiconductor layer AL.

For example, each connection hole set on the gate line WS is the connection hole between the gate line WS and the gate of each first transistor T1.

For example, each connection hole set on the second control signal line DS is the connection hole between the second control signal line DS and the gate of each second transistor T2.

For example, the two connection holes on the first connecting part M1-1 are respectively electrically connected to the source of the third transistor T3 and the drain of the driving transistor DMOS.

For example, the two connection holes on the second connecting part M1-2 are respectively electrically connected to the gate of the driving transistor DMOS and the drain of the first transistor T1.

For example, the two connection holes on the third connecting part M1-3 are respectively electrically connected to the source of the first transistor T1 and the data line DL.

Among them, each connection hole is filled with conductive materials, such as metal materials, which can include tungsten (W).

In some embodiments of the present application, as shown in FIG. 1, the pixel driving circuit further includes a compensation module 3, the compensation module 3 is electrically connected to the first node G, the second node S and the first power signal line ELVDD, and configured for compensating a threshold voltage of the drive module 2; and the compensation module 3 includes a first capacitor C1 and a second capacitor C2, a first polar plate of the first capacitor C1 is electrically connected to the source of the driving transistor DMOS, a second polar plate of the first capacitor C1 is electrically connected to the gate of the driving transistor DMOS; a first polar plate of the second capacitor C2 is electrically connected to the source of the driving transistor DMOS, a second polar plate of the second capacitor C2 is electrically connected to the first power signal line ELVDD.

Figure 14:
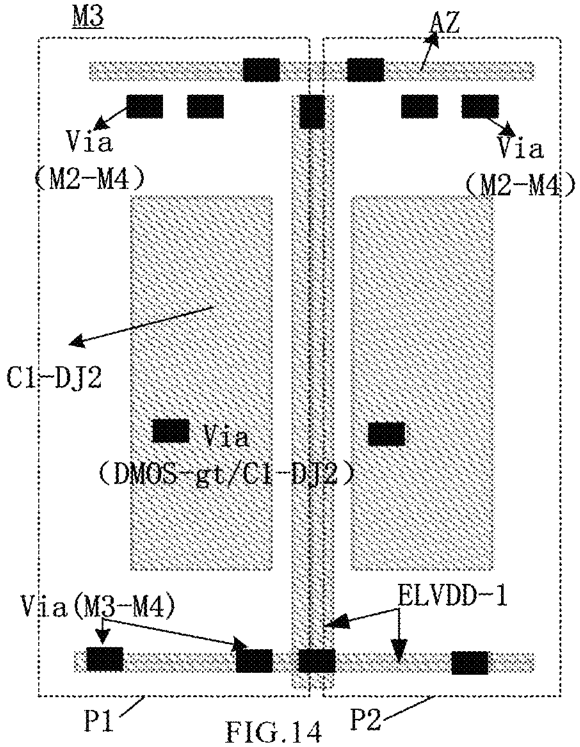
FIG. 14 is a top-view structural diagram of a third conductive layer according to an embodiment of the present application.

In some embodiments of the present application, as shown in FIG. 14, the first part ELVDD-1 of the first power signal line, the first control signal line AZ, and the second polar plate C1-DJ2 of the first capacitor are arranged on the same layer.

In some embodiments of the present application, the orthographic projection of the first capacitor C1 on the substrate overlaps with the orthographic projection of the driving transistor DMOS on the substrate, and the orthographic projection of the second capacitor C2 on the substrate overlaps with the orthographic projection of the driving transistor DMOS on the substrate. The second capacitor C2 is located at the side of the first capacitor C1 away from the driving transistor DMOS.

In the embodiment of the present application, by setting the driver transistor DMOS, the first capacitor C1, and the second capacitor C2 arranged in stacked, it is possible to greatly save the design space of the pixel driving circuit and more conducive to preparing display products with high PPI (Pixels Per Inch, pixel density unit).

Figure 12:
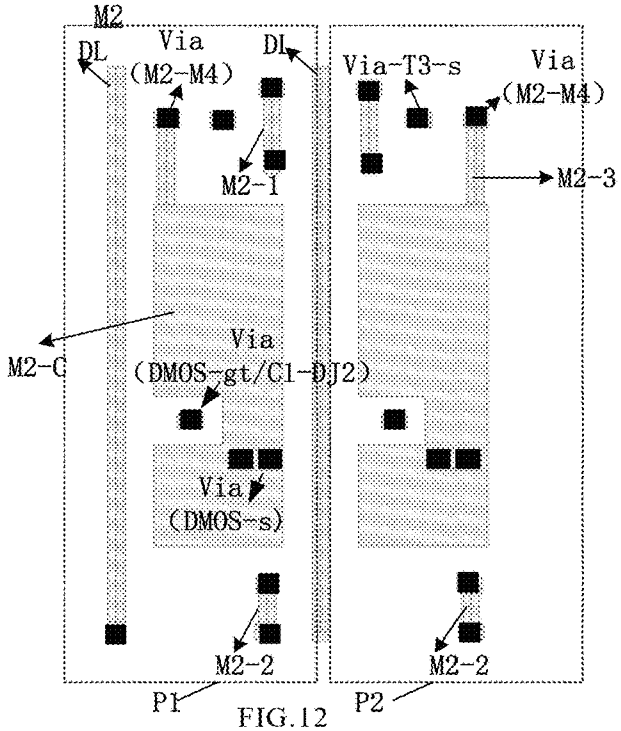
FIG. 12 is a top-view structural diagram of a second conductive layer according to an embodiment of the present application.

In some embodiments of the present application, the array base plate further includes a second conductive layer M2 located at a side of the first conductive layer M1 away from the substrate, combined with FIG. 12 and FIG. 13, the second conductive layer M2 includes the data lines DL and a first conductive pattern M2-C, the first conductive pattern M2-C is electrically connected to the source of the driving transistor DMOS; and the second conductive layer M2 further includes the first wiring M2-1 and a second wiring M2-2, the first wiring M2-1 is electrically connected to the gate of the third transistor T3 and the first control signal line AZ, while the second wiring M2-2 is electrically connected to the source of the second transistor T2 and the first power signal line ELVDD.

The shape of the graph of the orthographic projection of the first conductive pattern M2-C on the substrate is not limited here.

For example, the shape of the graph of the orthographic projection of the first conductive pattern M2-C on the substrate may include polygons, arcs, or combinations of the polygons and the arcs. Among them, the combination of the polygons and the arcs includes shapes formed by splicing the polygons and the arcs, or shapes formed by excavating some regions on the polygons and the arcs. Polygons can include triangles, quadrilaterals, pentagons, etc., while arcs can include fan-shaped, circular, elliptical, semi-circular, and the like.

For example, as shown in FIG. 12, the shape of the graph of the orthogonal projection of the first conductive pattern M2-C on the substrate can be a shape formed by excavating a region on a rectangle, which may be a polygon or an arc.

Among them, as shown in FIG. 12, a connection hole Via (DMOS-gt/C1-DJ2) is provided in the excavated region of the first conductive pattern M2-C, which is used to electrically connect the gate of the driving transistor DMOS with the second polar plate of the first capacitor C1. In order to avoid a short circuit between the first conductive pattern M2-C and the second polar plate of the first capacitor C1, the excavated region is provided so that the first conductive pattern M2-C avoids the connection hole Via (DMOS-gt/C1-DJ2).

For example, the first conductive pattern M2-C can serve as a part of the first polar plate of the first capacitor C1; the other part of the first polar plate of the first capacitor C1 can be electrically connected to the first conductive pattern M2-C through the connection hole Via (M2-M4) and the third wiring M-3. The introduction of the other part of the first polar plate of the first capacitor C1 can refer to the description in the following text.

For example, the first conductive pattern M2-C can serve as a part of the first polar plate of the second capacitor C2; the other part of the first polar plate of the second capacitor C2 can be electrically connected to the first conductive pattern M2-C through the connection hole Via (M2-M4) and the third wiring M-3. The introduction of the other part of the first polar plate of the second capacitor C2 can refer to the description in the following text.

For example, the first conductive pattern M2-C can simultaneously serve as a part of the first polar plate of the first capacitor C1 and a part of the first polar plate of the second capacitor C2.

For example, as shown in FIG. 12, the first conductive pattern M2-C can be electrically connected to the source of the driving transistor DMOS through a connecting hole Via (DMOS-s), so that the source potential of the driving transistor DMOS is present on the first conductive pattern M2-C.

In some embodiments of the present application, the array base plate further includes a third conductive layer M3 located at a side of the second conductive layer M2 away from the substrate, the third conductive layer M3 includes the first control signal line AZ, the second polar plate C1-DJ2 of the first capacitor C1 and the first part ELVDD-1 of the first power signal line.

Figure 15:
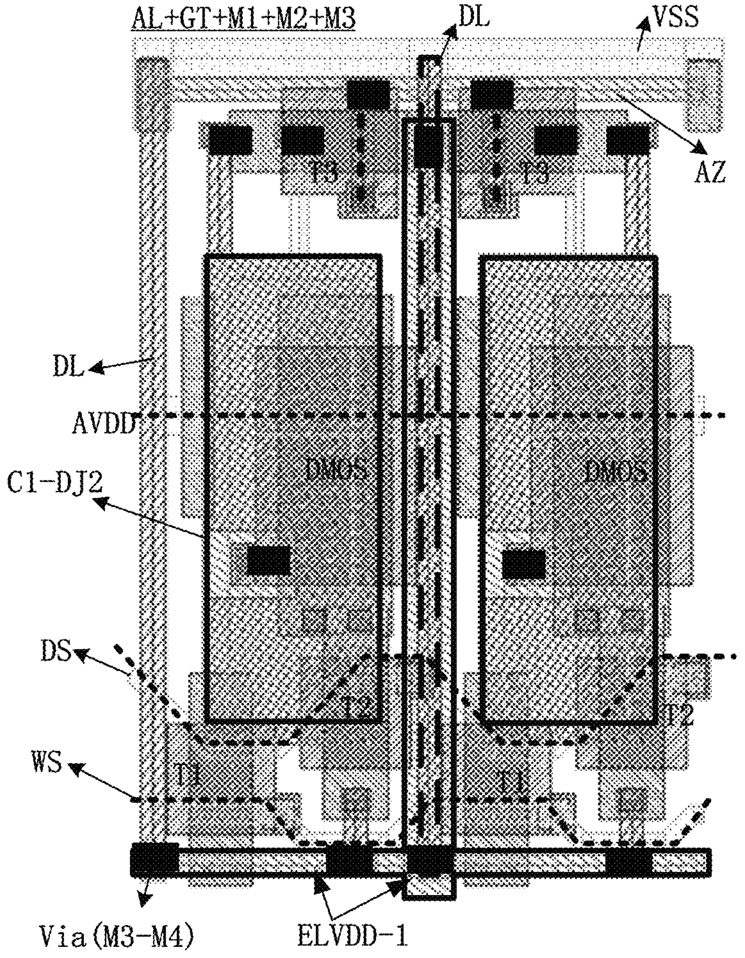
FIG. 15 is a top-view structural diagram of a semiconductor layer, a gate layer, a first conductive layer, a second conductive layer, and a third conductive layer stacked on an array base plate according to an embodiment of the present application.

For example, as shown in FIG. 15, the extension direction of the first control signal line AZ intersects with that of the data lines DL, and the orthographic projection of the first control signal line AZ on the substrate partially overlaps with the orthographic projection of the third transistor T3 on the substrate.

For example, the orthographic projection of the first control signal line AZ on the substrate partially overlaps with the orthographic projection of the second power signal line VSS on the substrate. Alternatively, there may be a gap between the orthographic projection of the first control signal line AZ on the substrate and the orthographic projection of the second power signal line VSS on the substrate.

For example, as shown in FIG. 15, FIG. 12 and FIG. 13, the first control signal line AZ is electrically connected to the gate of the third transistor T3 through the first wiring M2-1 in the second conductive layer M2.

For example, as shown in FIG. 14, the second polar plate C1-DJ2 of the first capacitor C1 is electrically connected to the gate of the driving transistor DMOS through the connection hole Via (DMOS-gt/C1-DJ2).

For example, combined with FIG. 14 and FIG. 20, in the region where the same row of sub-pixels are located, the shape of the graph of the orthographic projection of the first part ELVDD-1 of the first power signal line ELVDD on the substrate is multiple connected "U" shapes. Among them, the shape of the graph of the ELVDD of the first part ELVDD-1 of the first power signal line ELVDD corresponding to one sub-pixel on the substrate is a "U" shape. It should be noted that in FIG. 14, only the first part ELVDD-1 of the first power signal line between two adjacent sub-pixels is drawn, and the complete structure of the first part ELVDD-1 of the first power signal line is not drawn.

For example, combined with FIG. 14 and FIG. 20, in the region where the same row of sub-pixels perpendicular to the extension direction of the data lines DL are located, the first part ELVDD-1 of the first power signal line includes a sixth line segment XD6 and a plurality of seventh line segments XD7, each of the seventh line segments XD7 is connected to the sixth line segment XD6, the seventh line segments XD7 are located between the second polar plates C1-DJ2 of two adjacent first capacitors C1, the sixth line segment XD6 is located at a side of the second polar plate C1-DJ2 of the first capacitor C1 away from the first control signal line AZ; an extension direction of the sixth line segment XD6 is consistent with the extension direction of the first control signal line AZ.

For example, combined with FIG. 15 and FIG. 20, an orthographic projection of the sixth line segment XD6 on the substrate partially overlaps with an orthographic projection of the first transistor T1 on the substrate, an orthographic projection of the seventh line segment XD7 on the substrate partially overlaps with orthographic projections of the data lines DL on the substrate.

For example, the line width of the seventh line segment XD7 included in the first part ELVDD-1 of the first power signal line is greater than or equal to the line width of the data line DL.

For example, the line width of the seventh line segment XD7 included in the first part ELVDD-1 of the first power signal line is greater than or equal to the line width of the first control signal line AZ.

For example, the line width of the seventh line segment XD7 included in the first part ELVDD-1 of the first power signal line is greater than or equal to the line width of the sixth line segment XD6 included in the first part ELVDD-1 of the first power signal line.

For example, the source of the second transistor T2 can be directly connected to the seventh line segment XD7.

For example, the source of the second transistor T2 can be directly connected to the sixth line segment XD6.

Among them, the accompanying drawings provided in the embodiments of the present application are illustrated and explained using the example of the source of the second transistor T2 directly connected to the sixth line segment XD6.

In the embodiment of the present application, by setting that the first part ELVDD-1 of the first power signal line includes the sixth line segment XD6 and multiple seventh line segments XD7, the seventh line segment XD7 is located between the second polar plates C1-DJ2 of two adjacent first capacitors C1. Among them, the second polar plate C1-DJ2 of the first capacitor C1 has a gate potential of the driving transistor DMOS, which avoids the electrical signal cross-talk between the second polar plates C1-DJ2 of two adjacent first capacitors C1, thus avoiding the electrical signal cross-talk between the gates of the driving transistor DMOS of the two adjacent sub-pixels, improving the signal stability of the pixel driving circuit, and enhancing the display effect of the array base plate.

Figure 16:
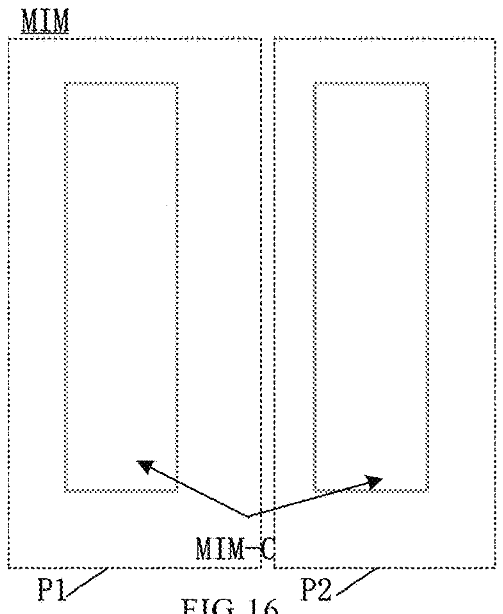
FIG. 16 is a top-view structural diagram of a capacitance conductive layer according to an embodiment of the present application.

In some embodiments of the present application, the array base plate further includes a capacitance conductive layer MIM located at a side of the third conductive layer M3 away from the substrate. As shown in FIG. 16, the capacitance conductive layer MIM includes a second conductive pattern MIM-C, an orthographic projection of the second conductive pattern MIM-C on the substrate overlaps with an orthographic projection of the first conductive pattern M2-C on the substrate, and the second conductive pattern MIM-C is indirectly electrically connected to the first conductive pattern M2-C.

For example, the second conductive pattern MIM-C is electrically connected to the fourth conductive layer M4 through a connection hole facing upwards.

Among them, the second conductive pattern MIM-C is indirectly electrically connected to the first conductive pattern M2-C, which refers to that: the second conductive pattern MIM-C is electrically connected to the first conductive pattern M2-C through other electrodes or components, both of them have the same potential. For example, since the first conductive pattern M2-C is electrically connected to the source of the driving transistor DMOS, the second conductive pattern MIM-C is indirectly electrically connected to the first conductive pattern M2-C, the second conductive pattern MIM-C and the first conductive pattern M2-C both have the source potential of the driving transistor DMOS.

Figure 17:
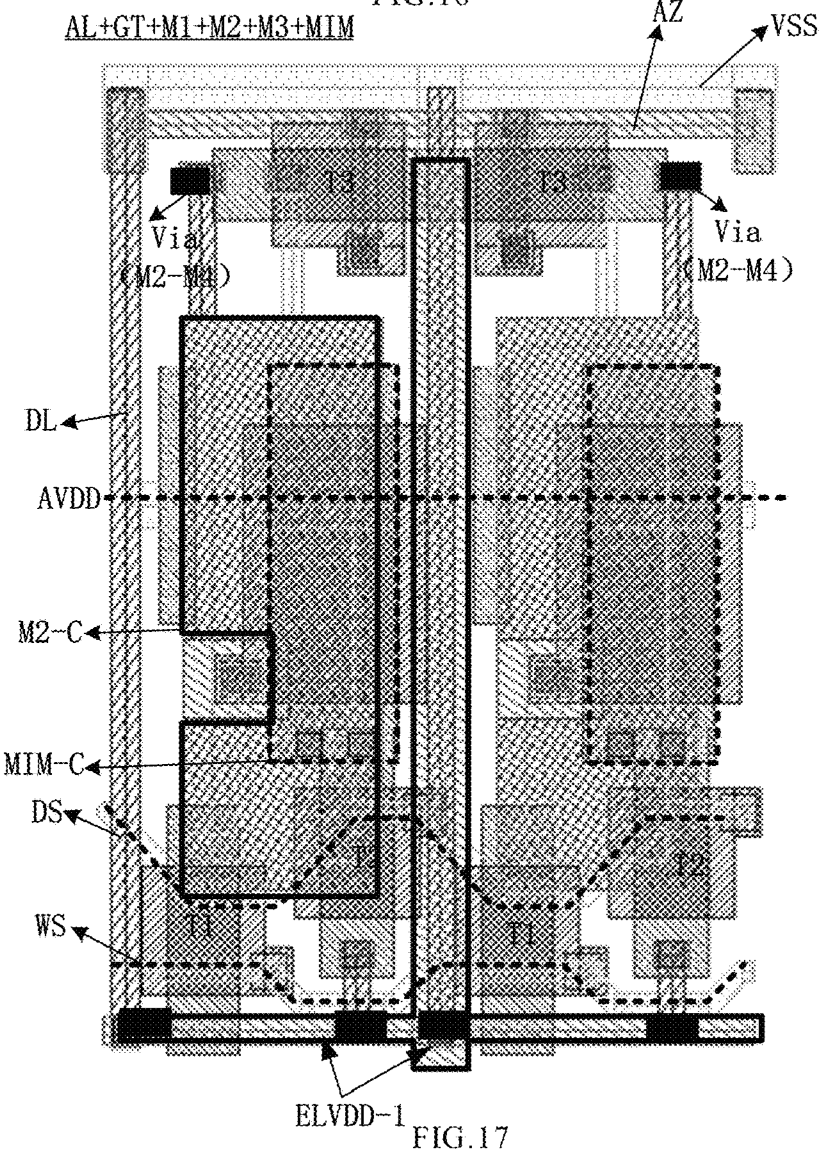
FIG. 17 is a top-view structural diagram of a semiconductor layer, a gate layer, a first conductive layer, a second conductive layer, a third conductive layer, and a capacitance conductive layer stacked on an array base plate according to an embodiment of the present application.

It should be noted that the orthographic projection of the second conductive pattern MIM-C on the substrate partially overlaps with the orthographic projection of the first conductive pattern M2-C on the substrate. In addition, as shown in FIG. 12, FIG. 16 and FIG. 17, the orthographic projection of the second conductive pattern MIM-C on the substrate does not overlap with the orthographic projection of the connection hole Via (DMOS-gt/C1-DJ2) on the substrate. Among them, as shown in FIG. 17, the connection hole Via (DMOS-gt/C1-DJ2) is located in the region excavated from the first conductive pattern M2-C.

There is no restriction on the shape of the graph of the orthographic projection of the second conductive pattern MIM-C on the substrate.

For example, the shape of the graph of the orthographic projection of the second conductive pattern MIM-C on the substrate may include polygons, arcs, or combinations of the polygons and the arcs. Among them, the combination of the polygons and the arcs includes shapes formed by splicing the polygons and the arcs, or shapes formed by excavating some regions on the polygons or arcs. Polygons can include triangles, quadrilaterals, pentagons, and the like, while arcs can include fan-shaped, circular, elliptical, semi-circular, and the like.

For example, as shown in FIG. 17, the shape of the graph of the orthographic projection of the second conductive pattern MIM-C on the substrate can be rectangular.

Figure 18:
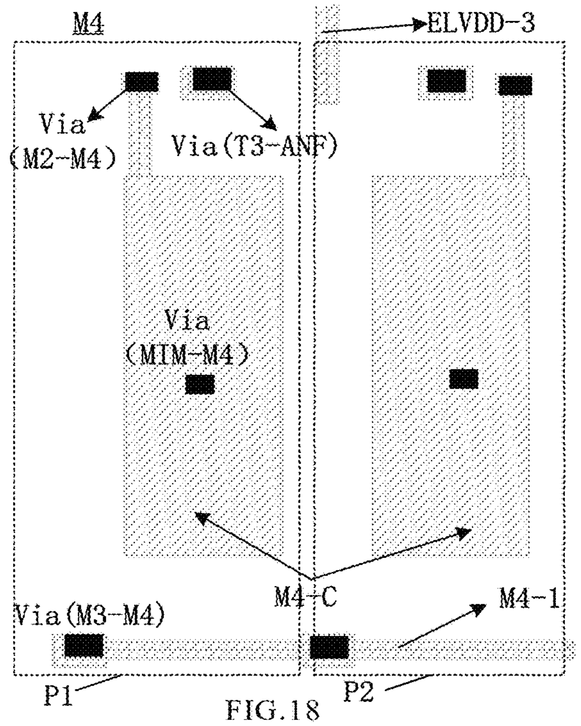
FIG. 18 is a top-view structural diagram of a fourth conductive layer according to an embodiment of the present application.

In some embodiments of the present application, as shown in FIG. 18, the array base plate further includes a fourth conductive layer M4 located at a side of the capacitance conductive layer MIM away from the substrate, the fourth conductive layer M4 includes a third conductive pattern M4-C, the third conductive pattern M4-C is electrically connected to the first conductive pattern M2-C, and the third conductive pattern M4-C is electrically connected to the second conductive pattern MIM_C.

For example, as shown in FIG. 18, the third conductive pattern M4-C is electrically connected to the first conductive pattern M2-C through the connection hole Via (M2-M4).

For example, the third conductive pattern M4-C is electrically connected to the second conductive pattern MIM-C through the connection hole Via (MIM-M4).

Among them, the first conductive pattern M2-C, the second conductive pattern MIM-C and the third conductive pattern M4-C collectively serve as the first polar plate of the first capacitor C1 and the first polar plate of the second capacitor C2. At this point, the first capacitor C1 is connected in series with the second capacitor C2, and the first electrode of the first capacitor C1 has the same potential as the first polar plate of the second capacitor C2. The first conductive pattern M2-C, the second conductive pattern MIM-C, and the third conductive pattern M4-C connected in series serve as the first electrode of the first capacitor C1 and the first polar plate of the second capacitor C2. In this way, while ensuring the normal operation of the pixel driving circuit, on the one hand, it increases the capacitance of the capacitor; on the other hand, it saves the design space of the array base plate, which is beneficial for preparing the display products with high PPI.

Figure 19:
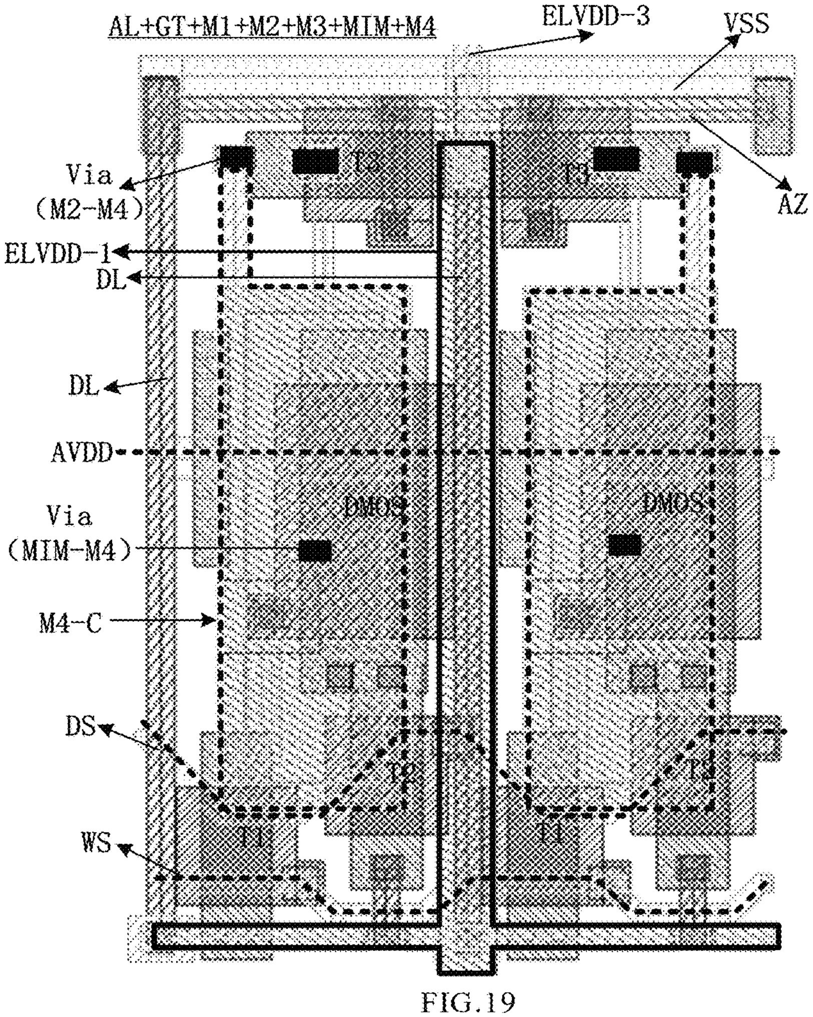
FIG. 19 is a top-view structural diagram of a semiconductor layer, a gate layer, a first conductive layer, a second conductive layer, a third conductive layer, a capacitance conductive layer, and a fourth conductive layer stacked on an array base plate according to an embodiment of the present application.

In some embodiments of the present application, as shown in FIG. 18 and FIG. 19, the fourth conductive layer M4 further includes a third part ELVDD-3 of the first power signal line and an adapter cable M4-1.

As shown in FIG. 20, the third part ELVDD-3 of the first power signal line electrically connects seventh line segments XD7 of two adjacent rows of sub-pixels together, the adapter cable M4-1 is electrically connected to the sixth line segment XD6 (the first part ELVDD-1 of the first power signal line includes the sixth line segment XD6) and the second part ELVDD-2 of the first power signal line, and an orthographic projection of the adapter cable M4-1 on the substrate overlaps with the orthographic projection of the sixth line segment XD6 on the substrate.

For example, combined with FIG. 18 and FIG. 14, the adapter cable M4-1 is electrically connected to the sixth line segment XD6 in the first part ELVDD-1 of the first power signal line through the connection hole Via (M3-M4).

For example, combined with FIG. 18 and FIG. 20, the adapter cable M4-1 is electrically connected to the second part ELVDD-2 of the first power signal line through the connection hole Via (M4/TM).

For example, the extension direction of the adapter cable M4-1 is the same as that of the sixth line segment XD6.

There is no restriction on the size relationship between the line width of the above adapter cable M4-1 and the sixth line segment XD6. For example, the line width of adapter cable M4-1 is less than or equal to the line width of the sixth line segment XD6. For example, the line width of the adapter cable M4-1 is greater than the line width of the sixth line segment XD6.

It should be noted that in the specification, for example, Via (M2-M3) refers to the connection hole between the second conductive layer M2 and the third conductive layer M3. For example, Via (T3-AN) is the connection hole between the third transistor T3 and the anode AN.

The naming of other connection holes is similar to this and will not be repeated.

Figure 22:
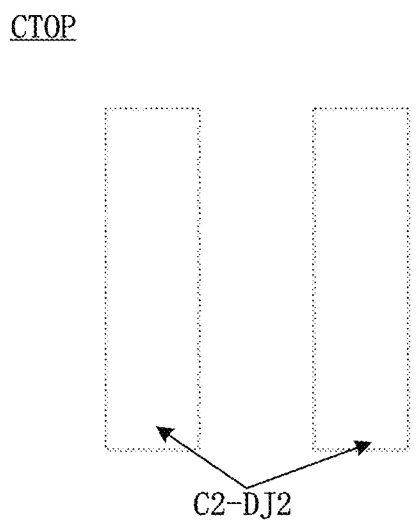
FIG. 22 is a top-view structural diagram of a fifth conductive layer according to an embodiment of the present application.
Figure 24:
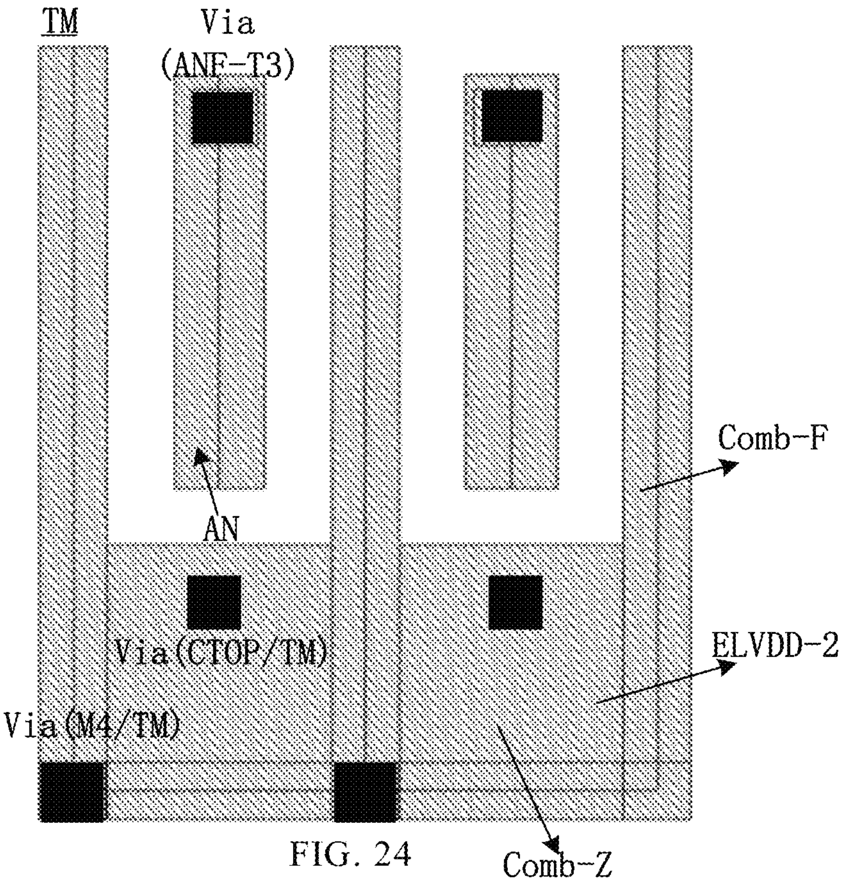
FIG. 24 is a top-view structural diagram of a fifth conductive layer according to an embodiment of the present application.

In some embodiments of the present application, as shown in FIG. 22 and FIG. 24, the array base plate further includes a fifth conductive layer M5 (or called CTOP) located at a side of the fourth conductive layer M4 away from the substrate, and a sixth conductive layer M6 (or called TM) located at a side of the fifth conductive layer M5 away from the substrate; and the fifth conductive layer CTOP includes the second polar plate C2-DJ2 of the second capacitor C2, the sixth conductive layer TM includes the second part ELVDD-2 of the first power signal line and the auxiliary anode ANF, the second polar plate C2-DJ2 of the second capacitor C2 is electrically connected to the second part ELVDD-2 of the first power signal line, an orthographic projection of the auxiliary anode ANF on the substrate overlaps with orthographic projections of the third transistor T3 and the driving transistor DMOS on the substrate, respectively.

Among them, since the second polar plate C2-DJ2 of the second capacitor C2 is the capacitor polar plate on the topmost side (the capacitor polar plate with the farthest distance from the substrate) of the array base plate, the fifth conductive layer can become the CTOP layer.

For example, as shown in FIG. 22 and FIG. 24, the second polar plate C2-DJ2 of the second capacitor C2 is electrically connected to the second part ELVDD-2 of the first power signal line through the connection hole Via (CTOP/TM).

Figure 23:
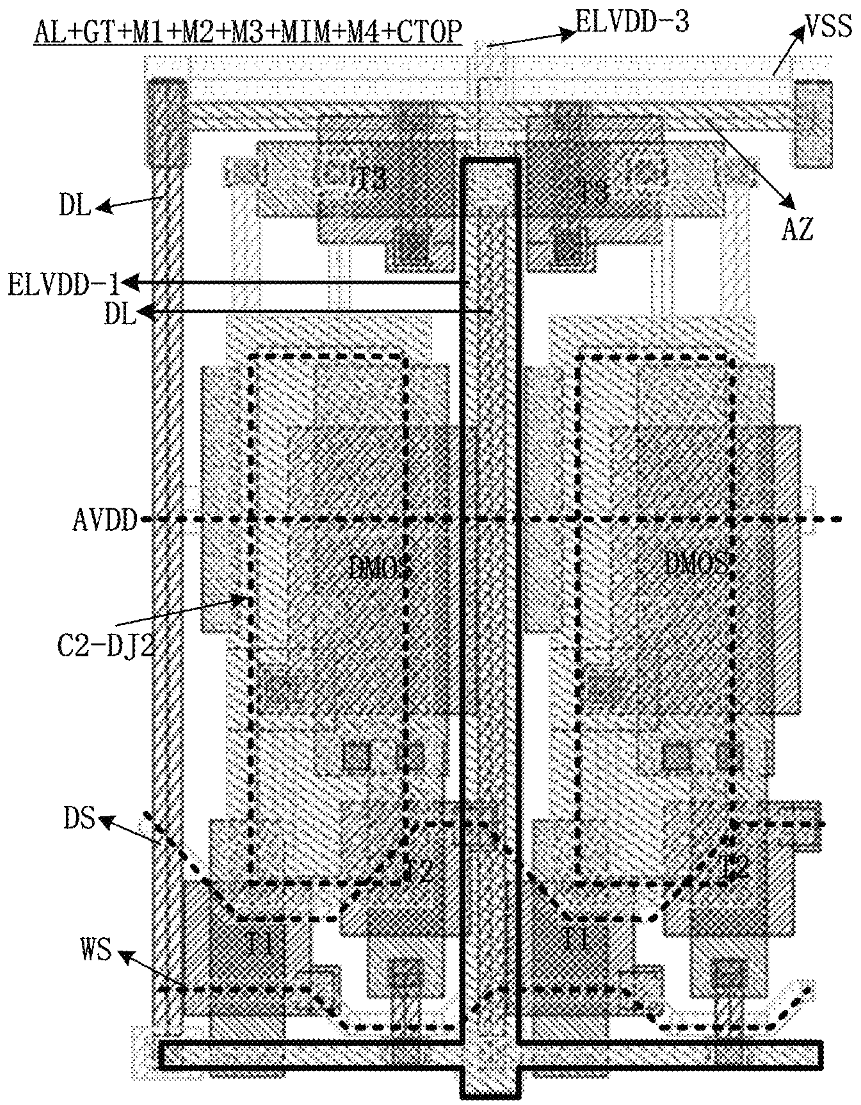
FIG. 23 is a top-view structural diagram of a semiconductor layer, a gate layer, a first conductive layer, a second conductive layer, a third conductive layer, a capacitance conductive layer, a fourth conductive layer, and a fifth conductive layer stacked on an array base plate according to an embodiment of the present application.

For example, as shown in FIG. 19 and FIG. 23, the orthographic projection of the second polar plate C2-DJ2 of the second capacitor C2 on the substrate is located within the orthographic projection of the third conductive pattern M4-C on the substrate. For example, the area of the orthographic projection of the second polar plate C2-DJ2 of the second capacitor C2 on the substrate is less than or equal to the area of the orthographic projection of the third conductive pattern M4-C on the substrate.

For example, as shown in FIG. 20 and FIG. 24, the graph of the orthographic projection of the second part ELVDD-2 of the first power signal line on the substrate can be a "U" shape, and in the region corresponding to the same row of sub-pixels, the graph of the orthographic projection of the second part ELVDD-2 of the first power signal line on the substrate can be multiple connected "U" shapes.

For example, in the region corresponding to the same row of sub-pixels, the graph of the orthographic projection of the second part ELVDD-2 of the first power signal line on the substrate can be comb shaped.

Figure 26:
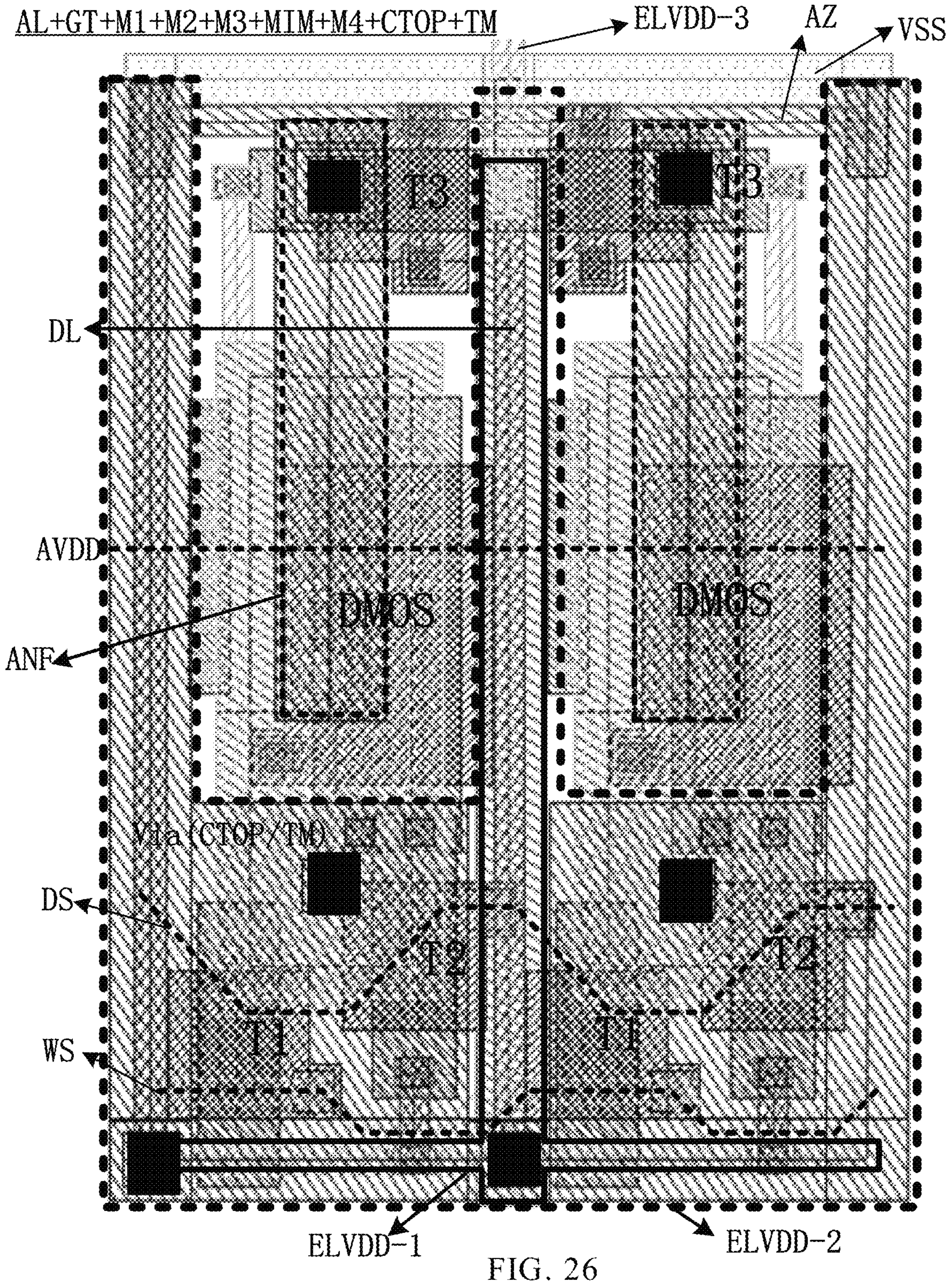
FIG. 26 is a top-view structural diagram of a semiconductor layer, a gate layer, a first conductive layer, a second conductive layer, a third conductive layer, a capacitance conductive layer, a fourth conductive layer, a fifth conductive layer, and a sixth conductive layer stacked on an array base plate according to an embodiment of the present application.

For example, as shown in FIG. 26, the orthographic projection of the auxiliary anode ANF on the substrate partially overlaps with the driving transistor DMOS, the orthographic projection of the auxiliary anode ANF on the substrate partially overlaps with the third transistor T3, the orthographic projection of the auxiliary anode ANF on the substrate partially overlaps with the first capacitor C1, and the orthographic projection of the auxiliary anode ANF on the substrate partially overlaps with the second capacitor C2.

For example, as shown in FIG. 26, the orthographic projection of the auxiliary anode ANF on the substrate partially overlaps with the orthographic projection of the first control signal line AZ on the substrate.

For example, as shown in FIG. 24, the auxiliary anode ANF is located in the region enclosed by the second part ELVDD-2 of the U-shaped first power signal line. In this way, the second part ELVDD-2 of the first power signal line can avoid signal interference or crosstalk of the auxiliary anode ANF in two adjacent sub-pixels, thereby improving the driving stability of the pixel driving circuit and enhancing the display effect.

Figure 21:
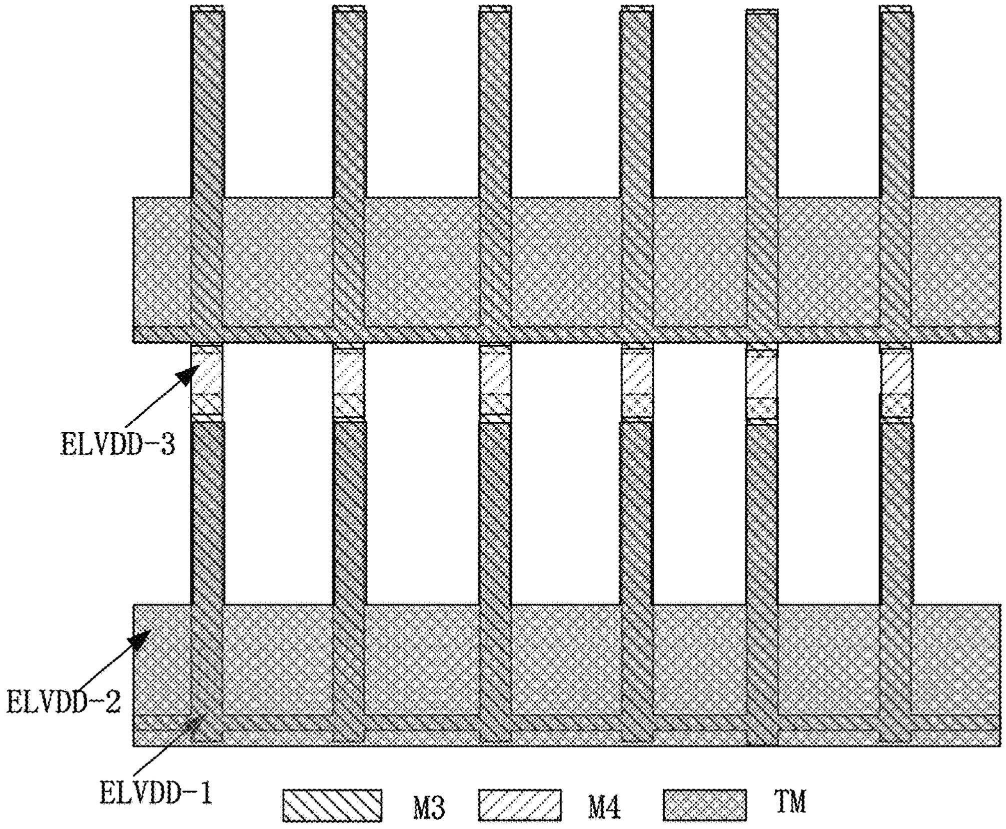
FIG. 21 is a top-view structural diagram of a first part, a second part and a third part of a first power signal line according to an embodiment of the present application.

In some embodiments of the present application, as shown in FIG. 21 and FIG. 24, in the region where the same row of sub-pixels perpendicular to the extension direction of the data lines DL are located, a shape of the orthographic projection of the second part ELVDD-2 of the first power signal line on the substrate is comb shaped, an area of the orthographic projection of the second part ELVDD-2 of the first power signal line on the substrate is greater than an area of the orthographic projection of the first part ELVDD-1 of the first power signal line on the substrate.

Among them, the comb shape is similar to the shape of a comb, including multiple comb teeth and a comb back connecting multiple comb teeth.

In some embodiments of the present application, as shown in FIG. 21 and FIG. 24, in the region where the same row of sub-pixels perpendicular to the extension direction of the data lines DL are located, the second part ELVDD-2 of the first power signal line includes a main extension portion Comb-Z and a plurality of branch extension portions Comb-F; among them, the main extension portion Comb-Z is equivalent to the comb back, and the plurality of branch extension portions Comb-F are equivalent to the comb teeth.

As shown in FIG. 26 and FIG. 28, an orthographic projection of the main extension portion Comb-Z on the substrate covers orthographic projections of the first transistor T1, the second transistor T2, the gate lines WS, the second control signal line DS, and the sixth line segment XD6 on the substrate, the branch extension portions Comb-F are located in a region between two adjacent auxiliary anodes ANF, and the branch extension portions Comb-F overlap with orthographic projections of the seventh line segment XD7 and the data lines DL on the substrate.

For example, the extension direction of the main extension portion Comb-Z intersects with that of the branch extension portion Comb-F, and the main extension portion Comb-Z connects multiple branch extension portions Comb-F together.

For example, the area of the orthographic projection of the main extension portion Comb-Z on the substrate is greater than the sum of the areas of the orthographic projection of the first transistor T1 and the second transistor T2 on the substrate.

For example, the orthographic projection of the main extension portion Comb-Z on the silicon substrate covers the source of the driving transistor DMOS.

For example, two adjacent first control signal lines AZ divide the data line DL into a plurality of data line segments, where the orthographic projections of the data line segments on the substrate overlaps with the orthographic projections of the branch extension portions Comb-F on the substrate.

For example, the area of the orthographic projections of the data line segments on the substrate is less than or equal to the area of the orthographic projection of the branch extension portions Comb-F on the substrate.

For example, the line width of the data line segments is less than or equal to the line width of the branch extension portions Comb-F.

For example, as shown in FIG. 28, each branch extension portion Comb-F overlaps with the orthographic projection of the third part ELVDD-3 of the first power signal line on the substrate. In the area where the same row of sub-pixels are located, the quantity of the third parts ELVDD-3 of the first power signal line is the same as the quantity of the branch extension portions Comb-F.

In the embodiment of the present application, the shape of the orthographic projection of the second part ELVDD-2 of the first power signal line on the substrate is comb shaped, the second part ELVDD-2 of the first power signal line includes the main extension portion Comb-Z and the plurality of branch extension portions Comb-F, and the auxiliary anode ANF is located between two adjacent branch extension portions Comb-F. In this way, it can greatly avoid signal interference or crosstalk of the auxiliary anode ANF in two adjacent sub-pixels, thereby improving the driving stability of the pixel driving circuit and improving the display effect. In addition, by setting the orthographic projection of the main extension portion Comb-Z on the substrate to cover the orthographic projections of the first transistor T1, the second transistor T2, the gate lines WS, the second control signal line DS, and the sixth line segment XD6 on the substrate, the size and area of the first power signal line ELVDD are greatly improved, thereby improving the conductivity of the first power signal line ELVDD and reducing the probability of the occurrence of IR Drop problems. Which can improve the voltage stability of the signal transmitted by the first power signal line ELVDD, thereby enhancing the driving stability of the pixel driving circuit array, enhancing the luminous stability and uniformity of the sub-pixel array, and improving the display effect.

In exemplary embodiments, the first conductive layer M1, the second conductive layer M2, the third conductive layer M3, the capacitance conductive layer MIM, the fourth conductive layer M4, the fifth conductive layer CTOP, and the sixth conductive layer TM can also be referred to as the first metal layer Metal 1, the second metal layer Metal 2, the third metal layer Metal 3, the capacitance conductive layer MIM used to form a Metal-Insulator-Metal (MIM) capacitor structure, the fourth metal layer Metal 4, the top polar-plate layer CTOP of the capacitor, and the top metal layer TM.

For example, metal materials such as silver (Ag), copper (Cu), aluminum (Al), or molybdenum (Mo) can be used for the gate layer GT, the first conductive layer M1, the second conductive layer M2, the third conductive layer M3, the capacitance conductive layer MIM, the fourth conductive layer M4, the fifth conductive layer CTOP, and the sixth conductive layer TM. Alternatively, alloy materials composed of metals can be used, such as aluminum neodymium alloy (AlNd) or molybdenum niobium alloy (MoNb). The alloy materials can be a single-layer structure. Alternatively, it can be a multi-layer composite structure, such as a stacked structure composed of a Mo layer, a Cu layer, and a Mo layer.

An insulation layer is provided between every two adjacent conductive layer, which can be made of materials such as silicon oxide SiOx, silicon nitride SiNx, or silicon oxynitride SiON. The insulation layer can be a single-layer structure or a multi-layer composite structure.

In addition, the number of the connection holes (also known as through holes) on the insulation layer between the conductive layers in the embodiments of the present application can be determined according to actual needs, and there is no restriction here.

In local regions, in order to improve the conductivity stability between connecting wires of different film layers or components, multiple via holes filled with conductive materials can be arranged between two conductive structures. The number of the through holes depicted in the attached drawings does not represent a limitation on their number, but is only an exemplary explanation.

There are no restrictions on the shape and arrangement of multiple through holes here.

For example, the planar shape of the through hole can be rectangular, circular, or elliptical, and the dimensions of multiple through holes can be the same or different.

The array base plate provided in the embodiments of the present application may further include a pixel definition layer, an organic light-emitting layer, a cathode, a common electrode layer (Common electrode), a first encapsulation layer, a color film structure layer, and a second encapsulation layer, and so on. Please refer to the introduction in related art for details, which will not be repeated here.

Figure 25:
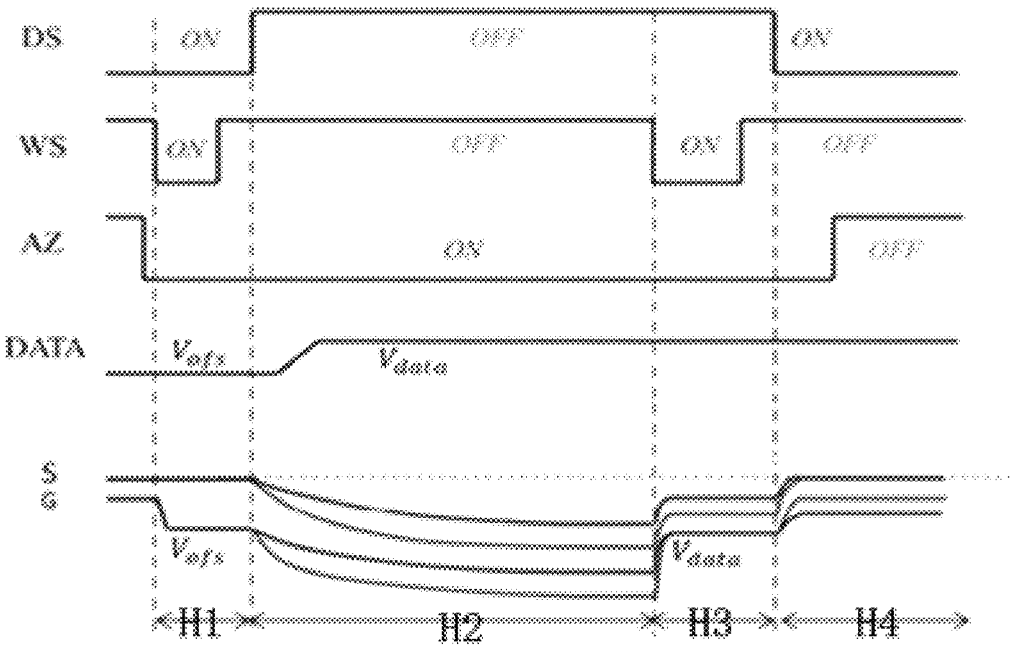
FIG. 25 is a signal timing diagram of the pixel driving circuit shown in FIG. 1.

FIG. 25 shows the signal timing diagram of the working process of the pixel driving circuit shown in FIG. 1, as shown in FIG. 25, the working process of the pixel driving circuit includes four stages.

Below, all transistors in the pixel driving circuit shown in FIG. 1 being the P-type MOSFET is taken as an example combined with the signal timing diagram shown in FIG. 25 to illustrate the working principle of the pixel driving circuit.

1. in the first stage H1 (Vofs write stage, also known as initialization stage), as shown in FIG. 25, a low-level second control signal is input to the second control signal line DS, a low-level gate drive signal (also known as scanning signal) is input to the gate line WS, and a low-level first control signal is input to the first control signal line AZ.

Figure 2:
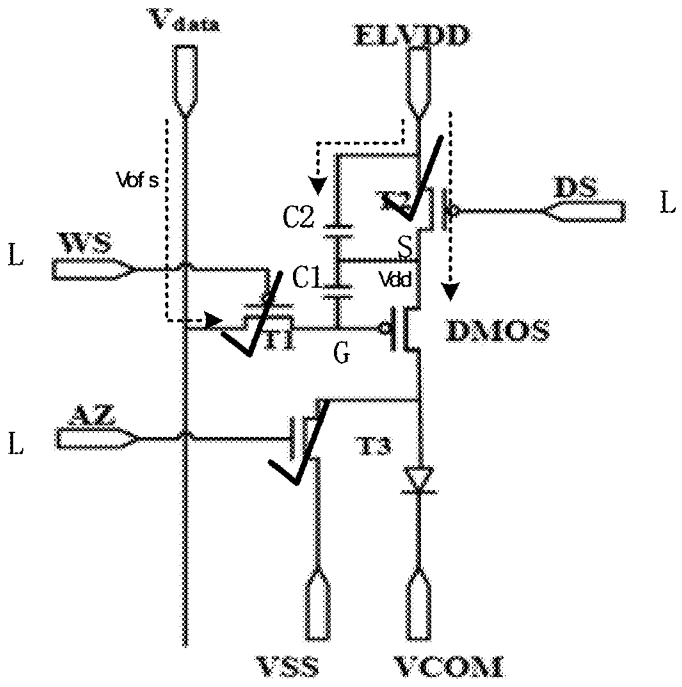
FIG. 2 to FIG. 5 are schematic diagrams illustrating the working principles of the four stages of the pixel driving circuit shown in FIG. 1.

As shown in FIG. 2, the transistor connected to the second control signal line DS receives a low-level second control signal, the transistor connected to the gate line WS receives a low-level gate drive signal, the transistor connected to the first control signal line AZ receives a low-level first control signal, the data line DL receives a Vofs voltage signal; the first transistor T1, the second transistor T2, and the third transistor T3 conduct, and the voltage value of Vofs is written to the first node G, the voltage value of Vdd is written to the second node S, at this point, Vini=Vdd−Vofs.

2. In the second stage H2 (self-discharge threshold voltage reading stage), as shown in FIG. 25, a high-level second control signal is input to the second control signal line DS, a high-level gate drive signal is input to the gate line WS, and a low-level first control signal is input to the first control signal line AZ.

Figure 3:
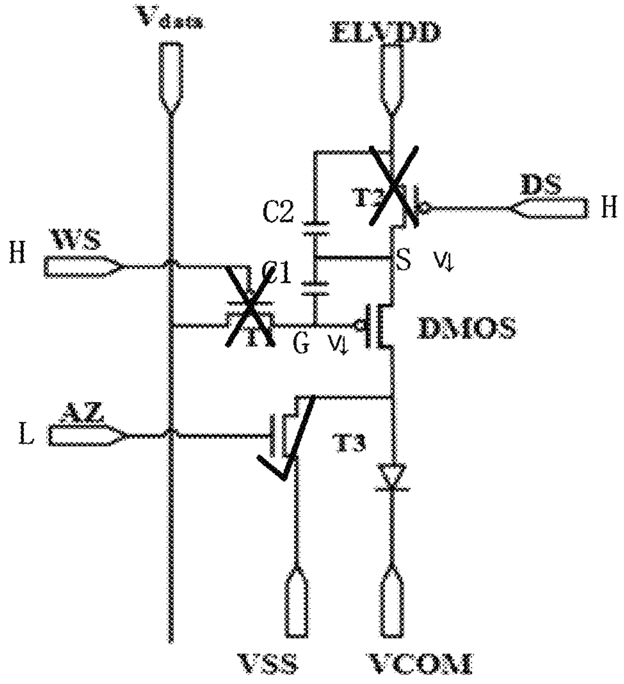

As shown in FIG. 3, the transistor connected to the second control signal line DS receives a high-level second control signal, the transistor connected to the gate line WS receives a high-level gate drive signal, and the transistor connected to the first control signal line AZ receives a low-level first control signal. The first transistor T1 and the second transistor T2 are turned off, and the third transistor T3 is turned on. Due to the floating of the first node G, under the action of the first capacitor C1, the voltage of the first node G changes with the voltage of the second node S. Therefore, the voltage difference between the first node G and the second node S remains unchanged in the previous stage, i.e., Vgs=Vini=Vdd−Vofs.

Under the action of the back gate effect, $|V_{TH-EF}|=a*(Vdd-Vs)+|V_{TH}|$, a is the coefficient of the back gate effect, and Vs is the voltage of the second node S. As the voltage Vs of the second node S decreases, $|V_{TH-EF}|$ stops discharging when $|V_{TH-EF}|$ increases to Vini and the driving transistor DMOS is turned off since Vgs remains constant at Vini. At this point:

$$a*(Vdd-Vs)+|V_{TH}|=Vini=Vdd-Vofs;$$

then $$Vs=Vdd+(|V_{TH}|-Vini)/a;$$

$$Vg=Vdd-Vini+(|V_{TH}|-Vini)/a.$$

3. In the third stage H3 (Vdata writing and threshold compensation stage), as shown in FIG. 25, a high-level second control signal is input to the second control signal line DS, a low-level gate drive signal is input to the gate line WS, and a low-level first control signal is input to the first control signal line AZ.

Figure 4:
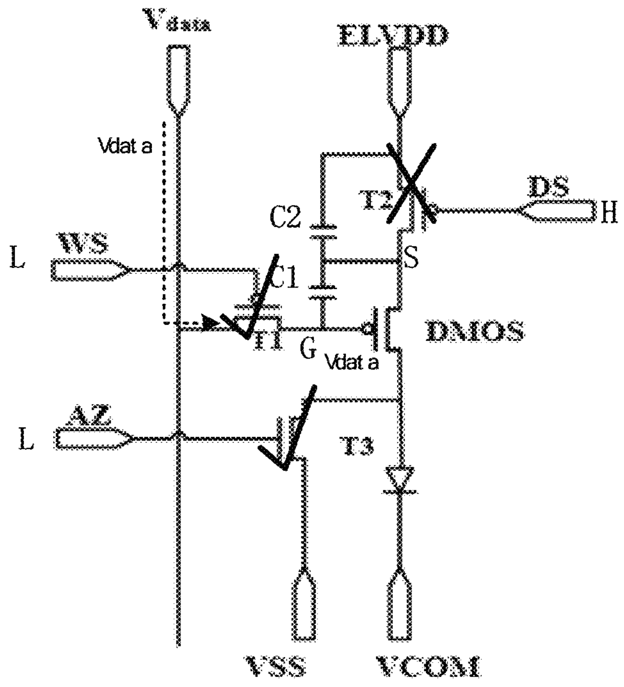

As shown in FIG. 4, the transistor connected to the second control signal line DS receives a high-level second control signal, the transistor connected to the gate line WS receives a low-level gate drive signal, the transistor connected to the first control signal line AZ receives a low-level first control signal, the first transistor T1 and the third transistor T3 are turned on, and the second transistor T2 is turned off. At this point, a Vdata signal is written to the first node G, and the voltage of the first node G changes from Vofs to Vdata. Due to the floating of the second node S, the voltage change value of the second node S is AVs.

$$\Delta Vs=(1-b)*Vg,$$

where $$b=C2(C1+C2);$$

$$\Delta Vg=Vdata-Vdd+Vini-(|V_{TH}|-Vini)/a=Vdata-Vdd+Vini+(Vini-|V_{TH}|)/a;$$

then, $$\Delta Vs=(1-b)*\left[Vdata-Vdd+Vini+(Vini-|V_{TH}|)/a\right];$$

At this point, the voltage of the second node S is:

$$Vdd-(Vini-|V_{TH}|)/a+\Delta Vs=Vdd-(Vini-|V_{TH}|)/a+(1-b)*\left[Vdata-Vdd+Vini-|V_{TH}|)/a\right]=Vdata+Vini-bVdata+bVdd*b(Vini-|V_{TH}|)/a-bVini;$$

then, $$|Vgs|=(1-b/a-b)*Vini+b|V_{TH}|/a+b(Vdd-Vdata).$$

4. In the fourth stage H4 (luminous stage), as shown in FIG. 25, a low-level second control signal is input to the second control signal line DS, a high-level gate drive signal is input to the gate line WS, and a high-level first control signal is input to the first control signal line AZ.

Figure 5:
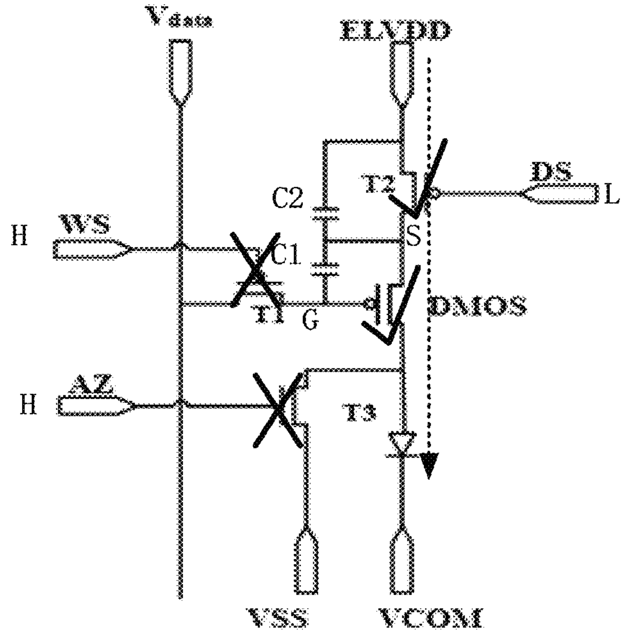

As shown in FIG. 5, the transistor connected to the second control signal line DS receives a low-level second control signal, the transistor connected to the gate line WS receives a high-level gate drive signal, the transistor connected to the first control signal line AZ receives a high-level first control signal, the first transistor T1 and the third transistor T3 are turned off, the second transistor T2 is turned on, and the driving transistor DMOS is turned on.

The current in the luminescent path between the second node S and the anode during the luminous stage of the light emitting device 6 is:

$$I_{oled}=\frac{1}{2}\mu_p C_{ox}W/L\left[\left(1-\frac{b}{a}-b\right)V_{int}+b(V_{DD}-V_{data})+\left(\frac{b}{a}-1\right)|V_{TH}|\right]^2=\frac{1}{2}\mu_p C_{ox}W/L[b(V_{DD}-V_{data})-bV_{int}]^2$$

From the above formula, it can be seen that the current in the luminescent path between the second node S and the anode is independent of the threshold voltage VTH of the driving transistor DMOS.

It should be noted that in FIGS. 2 to 5, the marking "x" represents that the transistor is in the cut-off state, the marking "V" represents that the transistor is in the conduction state. In addition, the marking "H" at the positions of the nodes of the pixel driving circuit (such as the first node G and the second node S) and the input end of the signal line of the pixel driving circuit represents that the signal at this position is a high-level signals, and the marking "L" represents that the signal at the position is a low-level signal. The high and low here only represent the relative size relationship between the input voltage signals.

It should also be noted that in practical applications, when each transistor of the pixel driving circuit mentioned above is an N-type transistor, the signal timing diagram of the circuit (including a DS signal, a WS signal, and an AZ signal) is opposite in phase to the timing signal shown in FIG. 25, and the working principle of the circuit is similar to the above process.

When the third transistor T3 in the pixel driving circuit mentioned above is the N-type transistor and the other transistors are the P-type transistors, the DS signal and the WS signal in the timing signal of the circuit diagram are the same as the timing signal in FIG. 25, while the AZ signal is opposite in phase to the timing signal in FIG. 25. The working principle of the circuit is similar to the above process.

The embodiment of the present application provides a display panel, including the array base plate as described above.

In the embodiment of the present application, the first power signal line ELVDD includes the first part ELVDD-1 and second part ELVDD-2 that are electrically connected, the first part ELVDD-1 of the first power signal line and the first control signal line AZ are arranged on the same layer, the second part ELVDD-2 of the first power signal line and the auxiliary anode ANF are arranged on the same layer, and the film layer where the auxiliary anode ANF is located is different from the film layer where the first control signal line AZ is located. In this way, it can significantly improve the conductivity of the first power signal line ELVDD, reduce the probability of occurring the IR Drop problem of the first power signal line ELVDD, improve the stability of the signal provided by the first power signal line ELVDD to the pixel driving circuit of each sub-pixel, thereby improving the stability and uniformity of the luminous brightness of each sub-pixel and improving the display effect.

The embodiment of the present application provides a display device, including the display panel as described above.

In exemplary embodiments, the display device of the present application may include but is not limited to an OLED display device or a QLED display device, which can be used for virtual reality devices or enhanced display devices, and so on. The display device may include but is not limited to a mobile phone, tablet, TV, display, laptop, digital photo frame, navigation device, or any product or component with display function.

In exemplary embodiments, the array base plate of the substrate in the display device can integrate a pixel driving circuit array, a Source Driver, a Gate Driver, an Emission Control Driver (EOA unit in the present application), an OSC (oscillator), a Gamma Register, and a display control module on the same chip using an integrated circuit. The pixel driving circuit, the Source Driver, the Gate Driver, the Emission Driver, and other parts are analog circuit modules, while the Gamma Register, the interface, and the display control modules are mainly digital modules. The array base plate of the substrate that integrates the digital modules and the analog modules is a typical SOC (System On Chip). Because the analog circuit modules and the digital circuit modules are mixed on the same chip (One Chip technology), the manufacturing process node of the chip is determined by the digital circuit modules with higher requirements in both the analog circuit modules and the digital circuit modules.

For example, the array base plate of the substrate of One Chip technology can be prepared using an integrated circuit manufacturing process less than 0.11 um or 55 nm. In practical applications, due to the high cost of One Chip technology, it is usually applied to small-sized display products, such as virtual reality (VR) or augmented reality (AR) in the field of near eye displays.

In exemplary embodiments, the array base plate of the substrate can also separate the analog circuit parts such as the pixel driver circuit array, the source driver, the gate driver, and the emission driver (i.e., EOA unit of the present application) from the OSC, the Gamma register, the interface, and the display control module, with changing from One Chip technology to Two Chip technology. The size of the analog circuit parts is determined by the size of the active area of the silicon-based micro display, but its manufacturing process requirements are low, and low process can be used to reduce this part of the cost. Moreover, due to the separation of the digital circuit parts, its size is reduced compared to the One Chip mode, and the cost can be further reduced. The digital circuit parts mainly includes the OSC, the gamma register, the interface, and the display control module. This part has a smaller size and can be prepared separately using high process technology that matches the requirements of circuit manufacturing, which is called the Two chip mode. The Two chip mode adopts a mode of separating the Display Driver Integrated Chip (DDIC) from the Display Panel (Panel) to process OLED devices on the Panel. After completion of processing and testing, the normally displayed finished products are bonded together with DDIC through methods such as COF (Chip on FPC) or COC (Chip on Chip) to form a controllable silicon-based micro display device.

The above is only a specific implementation of the present application, but the scope of protection of the present application is not limited to this. Within the scope of the disclosed technology, any change or replacement which may be easily thought by a person skilled in the art should be covered within the scope of protection of the present application. Therefore, the scope of protection of the present application shall be based on the scope of protection of the claims.

The invention claimed is:

1. An array base plate, comprising:

a substrate;

a plurality of sub-pixels that are located on the substrate and arranged in array; and a plurality of gate lines and a plurality of data lines, wherein the plurality of gate lines intersect with the plurality of data lines, each of the sub-pixels is located at a position limited by two adjacent gate lines and two adjacent data lines, and each of the sub-pixels comprises a pixel driving circuit and a light emitting device that are electrically connected; wherein the pixel driving circuit comprises:

a drive module electrically connected to a first node, a second node and an anode of the light emitting device, wherein the drive module is configured for conducting a path between the second node and the anode under control of a voltage of the first node, and generating a current in the path to make the light emitting device emit light; the second node is coupled to the first power signal line; and a first control module electrically connected to a first control signal line, a second power signal line and the anode of the light emitting device, wherein the first control module is configured for transferring a second power signal transmitted by the second power signal line to the anode under control of a first control signal transmitted by the first control signal line, wherein the first control module comprises a third transistor;

wherein the pixel driving circuit further comprises an auxiliary anode, the auxiliary anode is located between the anode and the substrate, and the auxiliary anode is electrically connected to the anode; the first power signal line comprises a first part and a second part that are electrically connected, the first part of the first power signal line and the first control signal line are arranged on a same layer, and the second part of the first power signal line and the auxiliary anode are arranged on a same layer, wherein the first part of the first power signal line and the second part of the first power signal line are located in different layers.

2. The array base plate according to claim 1, wherein the pixel driving circuit further comprises a second control module, wherein the second control module comprises a second transistor;

the second control module is electrically connected to the first power signal line, a second control signal line and the drive module, and configured for transferring a first power signal transmitted by the first power signal line to the drive module under control of a second control signal transmitted by the second control signal line, and assisting in generating the current in the path to make the light emitting device emit light;

wherein an orthographic projection of the second control module on the substrate overlaps with an orthographic projection of the second part of the first power signal line on the substrate.

3. The array base plate according to claim 2, wherein the pixel driving circuit further comprises an input module;

the input module is electrically connected to the gate lines, the data lines and the first node, and configured for writing data signals transmitted by the data lines into the first node under control of scan signals transmitted by the gate lines;

wherein an orthographic projection of the input module on the substrate overlaps with orthographic projections of the gate lines on the substrate, and the orthographic projection of the input module on the substrate overlaps with an orthographic projection of the second control signal line on the substrate.

4. The array base plate according to claim 3, wherein the input module and the second control module are located at a same side of the drive module, and the first control module is located at a side of the drive module away from the second control module.

5. The array base plate according to claim 4, wherein the input module comprises a first transistor, and the drive module comprises a driving transistor;

a gate of the first transistor is electrically connected to the gate line, a source of the first transistor is electrically connected to the data line, and a drain of the first transistor is electrically connected to a gate of the driving transistor;

a gate of the second transistor is electrically connected to the second control signal line, a source of the second transistor is electrically connected to the first power signal line, and a drain of the second transistor is electrically connected to a source of the driving transistor; and a gate of the third transistor is electrically connected to the first control signal line, a source of the third transistor is electrically connected to a drain of the driving transistor, and a drain of the third transistor is electrically connected to the second power signal line.

6. The array base plate according to claim 5, wherein the pixel driving circuit further comprises a first wiring, an extension direction of the first wiring intersects with an extension direction of the first control signal line, the first wiring is electrically connected to the gate of the third transistor and the first control signal line, and the first wiring and the data lines are arranged on a same layer.

7. The array base plate according to claim 6, wherein an orthographic projection of the gate of the third transistor on the substrate partially overlaps with an orthographic projection of the first control signal line on the substrate, an orthographic projection of the first wiring on the substrate partially overlaps with the orthographic projection of the gate of the third transistor on the substrate, the orthographic projection of the first wiring on the substrate extends from a side of the gate of the third transistor close to the first control signal line to a side of the gate of the third transistor away from the first control signal line, and the orthographic projection of the first wiring on the substrate overlaps with an orthographic projection of an active region of the third transistor on the substrate.

8. The array base plate according to claim 6, wherein the pixel driving circuit further comprises a second wiring, an extension direction of the second wiring is consistent with an extension direction of the data lines, the second wiring is electrically connected to the source of the second transistor and the first power signal line, and the second wiring and the data lines are arranged on the same layer.

9. The array base plate according to claim 8, wherein the extension direction of the second wiring intersects with an extension direction of the gate lines, and an orthographic projection of the second wiring on the substrate partially overlaps with the orthographic projection of the gate lines on the substrate; and the orthographic projection of the second wiring on the substrate extends from a position where an orthographic projection of the source of the second transistor on the substrate is located to a position where an orthographic projection of the first part of the first power signal line on the substrate is located.

10. The array base plate according to claim 8, wherein the orthographic projection of the second control signal line on the substrate overlaps with orthographic projections of the gate of the first transistor and the gate of the second transistor on the substrate; and the orthographic projection of the gate lines on the substrate overlaps with the orthographic projection of the gate of the first transistor on the substrate, and the orthographic projection of the gate lines on the substrate overlaps with an orthographic projection of an active region of the first transistor on the substrate.

11. The array base plate according to claim 10, wherein in a region where the same second control signal line is located, a distance from the gate of the first transistor along a direction parallel to the data lines to the gate of the driving transistor is greater than a distance from the gate of the second transistor along the direction parallel to the data lines to the gate of the driving transistor.

12. The array base plate according to claim 10, wherein in a region where the same row of sub-pixels are located, along a direction parallel to the data lines, a minimum distance from a part line segments of the second control signal line overlapping with the gate of the first transistor to the gate lines is less than a minimum distance from a part line segments of the second control signal line overlapping with the gate of the second transistor to the gate lines.

13. The array base plate according to claim 10, wherein orthographic projections of the data lines on the substrate overlap with an orthographic projection of the first part of the first power signal line on the substrate; and orthographic projections of the first transistor, the second transistor, the second control signal line and the gate lines on the substrate are located within the orthographic projection of the second part of the first power signal line on the substrate.

14. The array base plate according to claim 13, wherein the first power signal line further comprises a third part, an extension direction of the third part of the first power signal line intersects with the extension direction of the first control signal line, and the third part of the first power signal line connects the first parts of the first power signal lines of the sub-pixels in two adjacent rows together; and an orthographic projection of the third part of the first power signal line on the substrate partially overlaps with the orthographic projections of the data lines on the substrate and an orthographic projection of the first control signal line on the substrate, respectively.

15. The array base plate according to claim 14, wherein orthographic projections of the first part of the first power signal line and the third part of the first power signal line on the substrate jointly form a shape of a grid, and the sub-pixels are located in an enclosed region limited by the grid.

16. The array base plate according to claim 6, wherein the array base plate comprises a semiconductor layer located on the substrate, the semiconductor layer comprises a first part, a second part, a third part, a fourth part, a fifth part and a sixth part, and an area of an orthographic projection of the fourth part of the semiconductor layer on the substrate is greater than that of orthographic projections of the other parts of the semiconductor layer on the substrate;

the first part of the semiconductor layer comprises the source, the drain and an active region of the first transistor, the second part of the semiconductor layer comprises the source, the drain and an active region of the second transistor, the third part of the semiconductor layer comprises the source, the drain and an active region of the third transistor, the fourth part of the semiconductor layer comprises the source, the drain and an active region of the driving transistor, and the fifth part and the sixth part are both electrically connected to the substrate;

wherein in a region where one sub-pixel is located, the second part of the semiconductor layer and the fourth part of the semiconductor layer are an integrated structure; in the same row of sub-pixels perpendicular to an extension direction of the data lines, two sub-pixels are divided into one group, in a region where the same group of sub-pixels are located, two third parts of the semiconductor layers are an integrated structure.

17. The array base plate according to claim 16, wherein in the region where the same group of sub-pixels are located, two third transistors are symmetrically arranged, and two sixth parts of the semiconductor layer are symmetrically arranged.

18. The array base plate according to claim 16, wherein the array base plate further comprises a gate layer located at a side of the semiconductor layer away from the substrate; and the gate layer comprises the gates of the transistors, an orthographic projection of the gate layer on the substrate partially overlaps with an orthographic projection of the semiconductor layer on the substrate; regions of the semiconductor layer that overlap with the orthographic projection of the gate layer on the substrate are the active regions of the transistors, regions of the semiconductor layer that do not overlap with the orthographic projection of the gate layer on the substrate are the sources or the drains of the transistors; an area of an orthographic projection of the gate of the driving transistor on the substrate is greater than areas of orthographic projections of gates of other transistors on the substrate.

19. A display panel, comprising the array base plate according to claim 1.

20. A display device, comprising the display panel according to claim 19.

* * * * *